US011704311B2

(12) United States Patent
Ramanasankaran et al.

(10) Patent No.: US 11,704,311 B2
(45) Date of Patent: Jul. 18, 2023

(54) BUILDING DATA PLATFORM WITH A DISTRIBUTED DIGITAL TWIN

(71) Applicant: Johnson Controls Tyco IP Holdings LLP, Milwaukee, WI (US)

(72) Inventors: Rajiv Ramanasankaran, San Jose, CA (US); Ambuj Shatdal, Madison, WI (US); Dominick James O'Dierno, Mt Pleasant, WI (US); Brian Scott Otto, Menomonee Falls, WI (US); Miguel Galvez, Milwaukee, WI (US); Trent Mark Swanson, Wellington, FL (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/534,821

(22) Filed: Nov. 24, 2021

(65) Prior Publication Data

US 2023/0161764 A1    May 25, 2023

(51) Int. Cl.
*G06F 15/16*    (2006.01)
*G06F 16/2453*    (2019.01)
(Continued)

(52) U.S. Cl.
CPC ...... *G06F 16/24532* (2019.01); *G06F 16/211* (2019.01); *G06F 16/24553* (2019.01); *G06F 16/275* (2019.01)

(58) Field of Classification Search
None
See application file for complete search history.

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

U.S. Appl. No. 16/885,959, filed May 28, 2020, Johnson Controls Technology Co.

(Continued)

*Primary Examiner* — Alex Gofman
(74) *Attorney, Agent, or Firm* — Foley & Lardner LLP

(57) ABSTRACT

A method including receiving, by one or more processing circuits, building data, generating, by the one or more processing circuits, a first digital twin based on the building data, wherein a first system stores the first digital twin and a second system stores a second digital twin generated based on the building data, where the first digital twin includes a relationship that forms a connection between the first digital twin and the second digital twin by linking a first entity of the first entities of the first digital twin and a second entity of the second entities of the second digital twin, and performing, by the one or more processing circuits, one or more operations based on at least one of the first digital twin, the second digital twin, or the relationship that forms the connection between the first digital twin and the second digital twin.

20 Claims, 17 Drawing Sheets

(51) Int. Cl.
*G06F 16/21* (2019.01)
*G06F 16/2455* (2019.01)
*G06F 16/27* (2019.01)

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,463,322 B1 * | 10/2022 | Sha ................ H04L 41/122 |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |

(56) References Cited

U.S. PATENT DOCUMENTS

| | | |
|---|---|---|
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0239797 A1* | 9/2012 | Agrawal .............. H04L 41/12 709/224 |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |

(56) References Cited

U.S. PATENT DOCUMENTS

| | | |
|---|---|---|
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0202675 A1 | 7/2018 | Park et al. |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0026359 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0098113 A1 | 3/2019 | Park et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0258747 A1* | 8/2019 | Ml .................. G06F 16/9032 |
| 2019/0268178 A1 | 8/2019 | Fairweather et al. |
| 2019/0294978 A1* | 9/2019 | Sachs .................. G06F 16/2423 |
| 2019/0310979 A1 | 10/2019 | Masuzaki et al. |
| 2019/0361412 A1 | 11/2019 | Park et al. |
| 2019/0377306 A1 | 12/2019 | Harvey |
| 2020/0050163 A1* | 2/2020 | Ludwig .................. G05B 19/056 |
| 2020/0125043 A1 | 4/2020 | Park |
| 2020/0133470 A1 | 4/2020 | Fala et al. |
| 2020/0133472 A1 | 4/2020 | Fala et al. |
| 2020/0133978 A1 | 4/2020 | Ramamurti et al. |
| 2020/0226156 A1 | 7/2020 | Borra et al. |
| 2020/0285203 A1 | 9/2020 | Thakur et al. |
| 2020/0285657 A1* | 9/2020 | Ravizza .................. G06F 16/215 |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0208546 A1 | 7/2021 | Locke et al. |
| 2021/0311718 A1 | 10/2021 | Sinha et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0004445 A1 | 1/2022 | George et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| AU | 2019351573 A1 | 5/2021 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |

(56) References Cited

FOREIGN PATENT DOCUMENTS

| WO | WO-2017/205330 A1 | 11/2017 |
|----|-------------------|---------|
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |

OTHER PUBLICATIONS

U.S. Appl. No. 16/885,968, filed May 28, 2020, Johnson Controls Technology Co.
U.S. Appl. No. 17/354,338, filed Jun. 22, 2021, Johnson Controls Tyco IP Holdings LLP.
U.S. Appl. No. 17/354,436, filed Jun. 22, 2021, Johnson Controls Tyco IP Holdings LLP.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Novembers, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.

(56) References Cited

OTHER PUBLICATIONS

International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric CO., LTD., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3c, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).
U.S. Appl. No. 17/566,029, Passivelogic, Inc.
U.S. Appl. No. 17/567,275, Passivelogic, Inc.
U.S. Appl. No. 17/722,115, Passivelogic, Inc.

\* cited by examiner

BUILDING DATA PLATFORM WITH A DISTRIBUTED DIGITAL TWIN

BACKGROUND

The present disclosure relates generally to the management of building systems and devices of a building. The present disclosure relates more particularly to managing information of building systems and controlling the building systems.

A building can include various types of building subsystems, e.g., heating, ventilation, and air conditioning (HVAC) systems, security systems, fire response systems, access control systems, etc. In some cases, a central cloud system may manage the information of the various systems and control the various systems of the building. However, in some cases, local computing resources may be able to provide better real-time management of systems of a building. However, it may be difficult to manage the storage of information and operational responsibilities across local computing resources and cloud computing resources.

SUMMARY

One implementation of the present disclosure is a method including receiving, by one or more processing circuits, at least a portion of building data describing entities of a building and relationships between the entities, the entities represent at least one of a device, a space, the building, a point, or a person. The method includes generating, by the one or more processing circuits, a first digital twin based on the building data, wherein a first system stores the first digital twin and a second system stores a second digital twin generated based on the building data. The first digital twin includes first entities of the entities and first relationships of the relationships between the first entities, wherein the second digital twin includes second entities of the entities and second relationships of the relationships between the second entities, wherein the first digital twin includes a relationship that forms a connection between the first digital twin and the second digital twin by linking a first entity of the first entities of the first digital twin and a second entity of the second entities of the second digital twin. The method includes performing, by the one or more processing circuits, one or more operations based on at least one of the first digital twin, the second digital twin, or the relationship that forms the connection between the first digital twin and the second digital twin.

In some embodiments, the first system and the second system are at least one of a cloud system stored off premises from the building or an edge system stored on a premises of the building.

In some embodiments, the one or more processing circuits include at least one of a first processing circuit of the first system or a second processing circuit of the second system.

In some embodiments, the one or more processing circuits include a processing circuit of the first system. In some embodiments, performing the one or more operations includes executing, by the processing circuit of the first system, an agent stored by the first system, the agent configured to perform the one or more operations based on the first digital twin and ingesting, by the agent, a result of the one or more operations into the first digital twin.

In some embodiments, the second digital twin includes a second relationship that forms another connection between the second digital twin and the first digital twin by linking the second entity of the second entities of the second digital twin and the first entity of the first entities of the first digital twin.

In some embodiments, the one or more processing circuits include a first processing circuit of the first system and a second processing circuit of the second system. In some embodiments, the method includes performing an onboarding to generate the first digital twin and the second digital twin by receiving, by the first processing circuit of the first system, first building data of the building data, generating, by the first processing circuit of the first system, the first digital twin based on the first building data, receiving, by the second processing circuit of the second system, second building data of the building data, generating, by the second processing circuit of the second system, the second digital twin based on the second data, identifying, by the first processing circuit of the first system, the relationship that forms the connection between the first digital twin and the second digital twin by communicating with the second system, and causing, by the first processing circuit of the first system, the first digital twin to include the relationship.

In some embodiments, the first digital twin includes a first graph structure including first nodes representing the first entities and first edges between the first nodes representing the first relationships between the first entities. In some embodiments, the second digital twin includes a second graph structure including second nodes representing the second entities and second edges between the second nodes representing the second relationships between the second entities.

In some embodiments, the first graph structure includes a node identifying the second graph structure. In some embodiments, the first graph structure includes an edge between a first node of the first nodes representing the first entity and the node identifying the second graph structure, wherein the edge represents the relationship between the first entity of the first entities of the first digital twin and the second entity of the second entities of the second digital twin.

In some embodiments, the edge includes data including a first indication of the first entity, a second indication that the first entity is stored by the first graph structure, a third indication of the second entity, a fourth indication that the second entity is stored by the second graph structure, and a fifth indication of a relationship type of relationship types describing the relationship between the first entity of the first entities of the first digital twin and the second entity of the second entities of the second digital twin.

In some embodiments, the one or more processing circuits include a processing circuit of the first system. In some embodiments, performing the one or more operations includes querying, by the processing circuit of the first system, the first digital twin based on a query, identifying, by the processing circuit of the first system, that a query result of the query is stored in the second digital twin based on the relationship that forms the connection between the first digital twin and the second digital twin, communicating, by the processing circuit of the first system, the query to the second system, receiving, by the processing circuit of the first system, the query result, wherein the query result is based on the second system querying the second digital twin based on the query, and performing, by the processing circuit of the first system, the one or more operations based on the query result.

In some embodiments, the one or more processing circuits include a second processing circuit of the second system. In some embodiments, the method includes receiving, by the second processing circuit of the second system, the query from the processing circuit of the first system, querying, by the second processing circuit of the second system, the second digital twin with the query to generate the query result, and communicating, by the second processing circuit of the first system, the query result to the processing circuit of the first system.

In some embodiments, the method includes identifying, by the processing circuit of the first system, that the second system stores the second digital twin based on a lookup table. In some embodiments, the lookup table stores indications of digital twins including the first digital twin and the second digital twin and links between the digital twins and systems that store the digital twins, the systems including the first system and the second system.

Another implementation of the present disclosure is a system including one or more memory devices storing instructions thereon that, when executed by one or more processors, cause the one or more processors to receive at least a portion of building data describing entities of a building and relationships between the entities, the entities represent at least one of a device, a space, the building, a point, or a person. The instructions cause the one or more processors to generate a first digital twin based on the building data, wherein the system stores the first digital twin and a second system stores a second digital twin generated based on the building data, wherein the first digital twin includes first entities of the entities and first relationships of the relationships between the first entities, wherein the second digital twin includes second entities of the entities and second relationships of the relationships between the second entities, wherein the first digital twin includes a relationship that forms a connection between the first digital twin and the second digital twin by linking a first entity of the first entities of the first digital twin and a second entity of the second entities of the second digital twin. The instructions cause the one or more processors to perform one or more operations based on at least one of the first digital twin, the second digital twin, or the relationship that forms the connection between the first digital twin and the second digital twin.

In some embodiments, the system and the second system are at least one of a cloud system stored off premises from the building or an edge system stored on a premises of the building.

In some embodiments, the instructions cause the one or more processors to execute an agent stored by the first system, the agent configured to perform the one or more operations based on the first digital twin and ingest a result of the one or more operations into the first digital twin.

In some embodiments, the second digital twin includes a second relationship that forms another connection between the second digital twin and the first digital twin by linking the second entity of the second entities of the second digital twin and the first entity of the first entities of the first digital twin.

In some embodiments, the first digital twin includes a first graph structure including first nodes representing the first entities and first edges between the first nodes representing the first relationships between the first entities. In some embodiments, the second digital twin includes a second graph structure including second nodes representing the second entities and second edges between the second nodes representing the second relationships between the second entities.

In some embodiments, the instructions cause the one or more processors to query the first digital twin based on a query, identify that a query result of the query is stored in the second digital twin based on the relationship that forms the connection between the first digital twin and the second digital twin, communicate the query to the second system; receive the query result, wherein the query result is based on the second system querying the second digital twin based on the query, and perform the one or more operations based on the query result.

Another implementation of the present disclosure is one or more computer readable medium storing instructions thereon that, when executed by one or more processors, cause the one or more processors to receive at least a portion of building data describing entities of a building and relationships between the entities, the entities represent at least one of a device, a space, the building, a point, or a person. The instructions cause the one or more processors to generate a first digital twin based on the building data, wherein a first system stores the first digital twin and a second system stores a second digital twin generated based on the building data, wherein the first digital twin includes first entities of the entities and first relationships of the relationships between the first entities, wherein the second digital twin includes second entities of the entities and second relationships of the relationships between the second entities, wherein the first digital twin includes a relationship that forms a connection between the first digital twin and the second digital twin by linking a first entity of the first entities of the first digital twin and a second entity of the second entities of the second digital twin. The instructions cause the one or more processors to perform one or more operations based on at least one of the first digital twin, the second digital twin, or the relationship that forms the connection between the first digital twin and the second digital twin.

In some embodiments, the first digital twin includes a first graph structure including first nodes representing the first entities and first edges between the first nodes representing the first relationships between the first entities. In some embodiments, the second digital twin includes a second graph structure including second nodes representing the second entities and second edges between the second nodes representing the second relationships between the second entities.

In some embodiments, the instructions cause the first system to perform one or more particular operations based on data received from the second system, the data based on the second digital twin, identify a communication issue between the first system and the second system, and perform the one or more particular operations based on second data determined based on the first digital twin.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
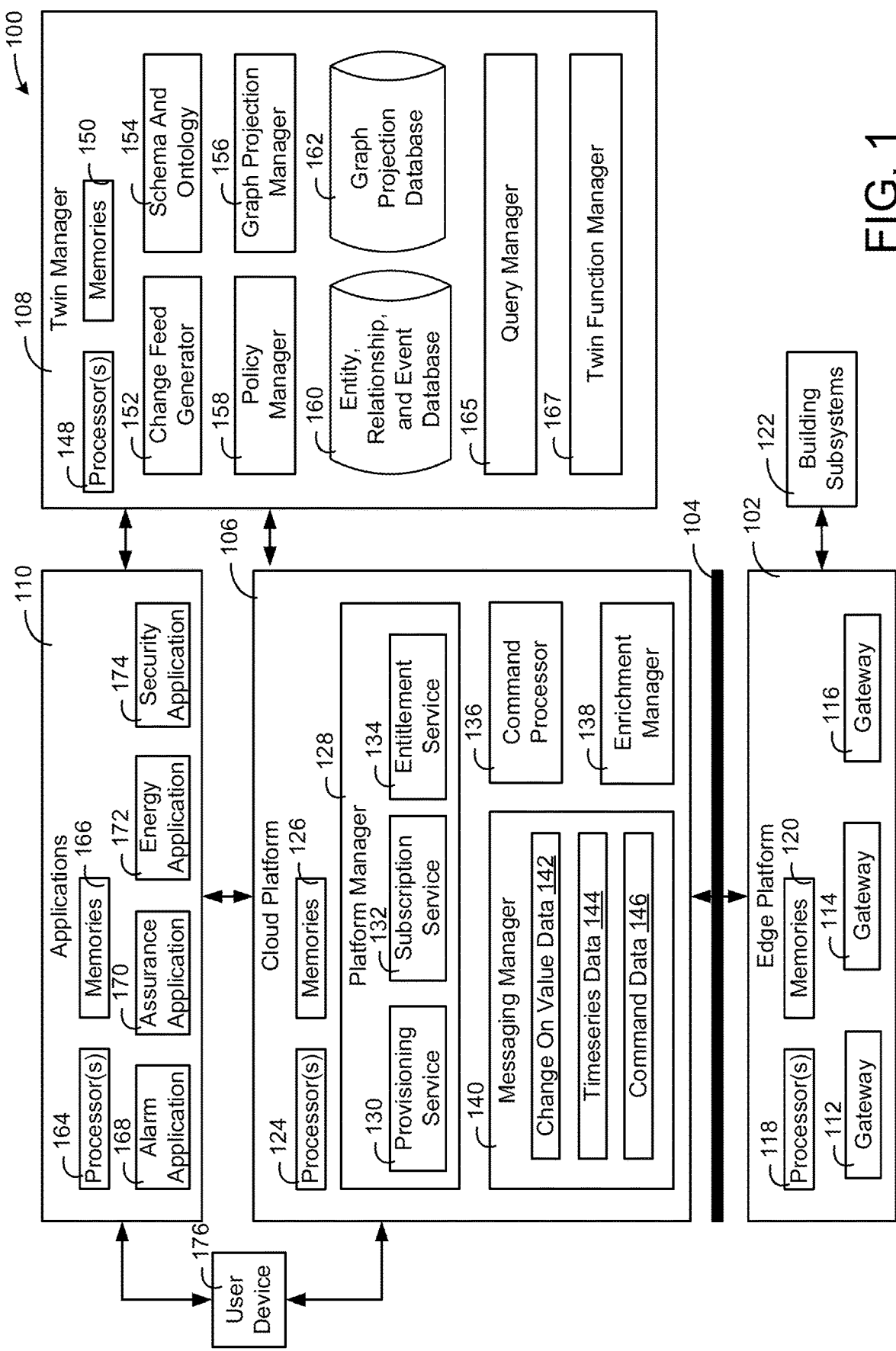
FIG. 1 is a block diagram of a building data platform including an edge platform, a cloud platform, and a twin manager, according to an exemplary embodiment.

Referring generally to the FIGURES, systems and methods for distributing a digital twin of a building across cloud and edge devices are shown, according to various exemplary embodiments. A digital twin can be a virtual representation of a building and/or an entity of the building (e.g., space, piece of equipment, occupant, etc.). Furthermore, the digital twin can represent a service performed in a building, e.g., facility management, clean air optimization, energy prediction, equipment maintenance, etc.

In some embodiments, the digital twin can include an information data store and a connector. The information data store can store the information describing the entity that the digital twin operates for (e.g., attributes of the entity, measurements associated with the entity, control points or commands of the entity, etc.). In some embodiments, the data store can be a graph including various nodes and edges. The connector can be a software component that provides telemetry from the entity (e.g., physical device) to the information store. Furthermore, the digital twin can include an artificial intelligence (AI), e.g., an AI agent. The AI can be one or more rules based engines, machine learning algorithms, and/or models that operate based on information of the information data store and output information. The AI agent can run against the digital twin. In some embodiments, the AI agent can run against a common data model, e.g., a BRICK model, and can be easily implemented in various different buildings, e.g., against various different building models of the system format.

In some embodiments, the AI agent for the digital twin can call an AI service to determine inferences and/or predict future data values. In some embodiments, the predictions are potential future states. In some embodiments, the predictions predict a timeseries of a data point into the future. The predictions could be predicted indoor temperature for an hour, inferred future air quality from 15 minute air quality readings, etc. In some embodiments, the digital twin can store predicted and/or inferred information in a graph data store as a node in the graph data store related to an entity that the digital twin represents or otherwise operates for. In some embodiments, the digital twin, or other digital twins, can operate against the predicted and/or inferred data, e.g., operate to construct and implement control algorithms for operating equipment of a building based on predicted future data points of the building.

Some systems may implement a digital twin on a cloud platform only. However, such a system may not be able to handle a hybrid implementation of a digital twin where the digital twin is stored across a one or more cloud and/or edge systems. In some embodiments, the building system described herein can distribute the digital twin across one or more cloud and/or edge systems. In some embodiments, operational capabilities of a digital twin can be distributed and/or implemented by the building system across the one or more cloud and/or edge systems.

In some embodiments, a building graph (which may be part of a digital twin or make up the digital twin) can be distributed across the one or more cloud and/or edge systems. The building graph can be divided into one or more interrelated building graphs that are distributed. In this regard, information pertaining to a particular edge system can be stored in a building graph specific to the edge system and interrelated to other building graphs stored in other cloud and/or edge systems. In this regard, algorithms, analytics, computing elements, etc. of the particular edge system can run against the local building graph.

In some embodiments, each building graph distributed across the one or more edge and/or cloud systems can be connected to each other. For example, a first building graph may store one or more nodes or edges that connect the first building graph to a second building graph stored by a second system. In this regard, a first system can traverse the nodes or edges of the first building graph that the first system stores to identify a second building graph stored by a second system, the second building graph storing information needed to fill a query of the first system. The first system can send the query to the identified second system and receive a result of the query filled by the second system based on the second building graph.

In some embodiments, the divided and distributed building graph can help separate operating concerns through localizing operations. In some embodiments, the building system can distribute responsibilities to various edge and/or cloud systems. Because each edge system handles its own responsibilities with its own graph, the edge system may not need to delay data management or control for passing data or states between the edge system and a central cloud platform. In some embodiments, the portion of the building graph stored by each edge and/or cloud system can include its own format extensions and/or features. For example, an edge system that manages video surveillance systems may store its graph in a formatted extended with specific data types, attributes, relationship types etc. specific to video surveillance systems while a second HVAC system may store its graph in the same format but with extensions for specific data types, attributes, relationship types, etc. specific to HVAC systems.

In some embodiments, distributing and/or dividing the building graph across multiple cloud and/or edge systems can resolve security issues. In some embodiments, data may be more secure if the data stays within a building and does not need to be transferred via one or more external networks from the building to a cloud system. Because the edge systems can store their own building graphs and perform operations based on the edge systems, the data of the building may not need to be transferred outside the building and thus is less likely to be obtained by other entities.

The divided building graph can, in some embodiments, provide flexibility in where digital twin computations are performed. For example, because each cloud and/or edge system can include the building graph that each cloud and/or edge system needs, each cloud and/or edge system can locally run computational functions against the building graph that the system stores. In some embodiments, functions such as agents can run locally within each system. Examples of agents and agent related processing can be found in U.S. patent application Ser. No. 17/354,436 filed Jun. 22, 2021, U.S. patent application Ser. No. 17/354,338 filed Jun. 22, 2021, U.S. patent application Ser. No. 17/148,851 filed Jan. 14, 2021, U.S. patent application Ser. No. 15/723,624 filed Oct. 3, 2017, U.S. patent application Ser. No. 16/008,885 filed Jun. 14, 2018, U.S. patent application Ser. No. 16/143,243 filed Sep. 26, 2018, U.S. patent application Ser. No. 16/533,499 filed Aug. 6, 2019, and U.S. patent application Ser. No. 16/142,859 filed Aug. 26, 2018, the entirety of which is incorporated by reference herein.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:
{
"id": "someguid",
"eventType": "Device Heartbeat",
"eventTime": "2018-01-27T00:00:00+00:00"
"eventValue": 1,
"deviceID": "someguid"
}

An example of an enriched event generated by the enrichment manager 138 may be:
{
"id": "someguid",
"eventType": "Device Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a graph projection manager 156, a policy manager 158, an entity, relationship, and event database 160, and a graph projection database 162.

Figure 11:
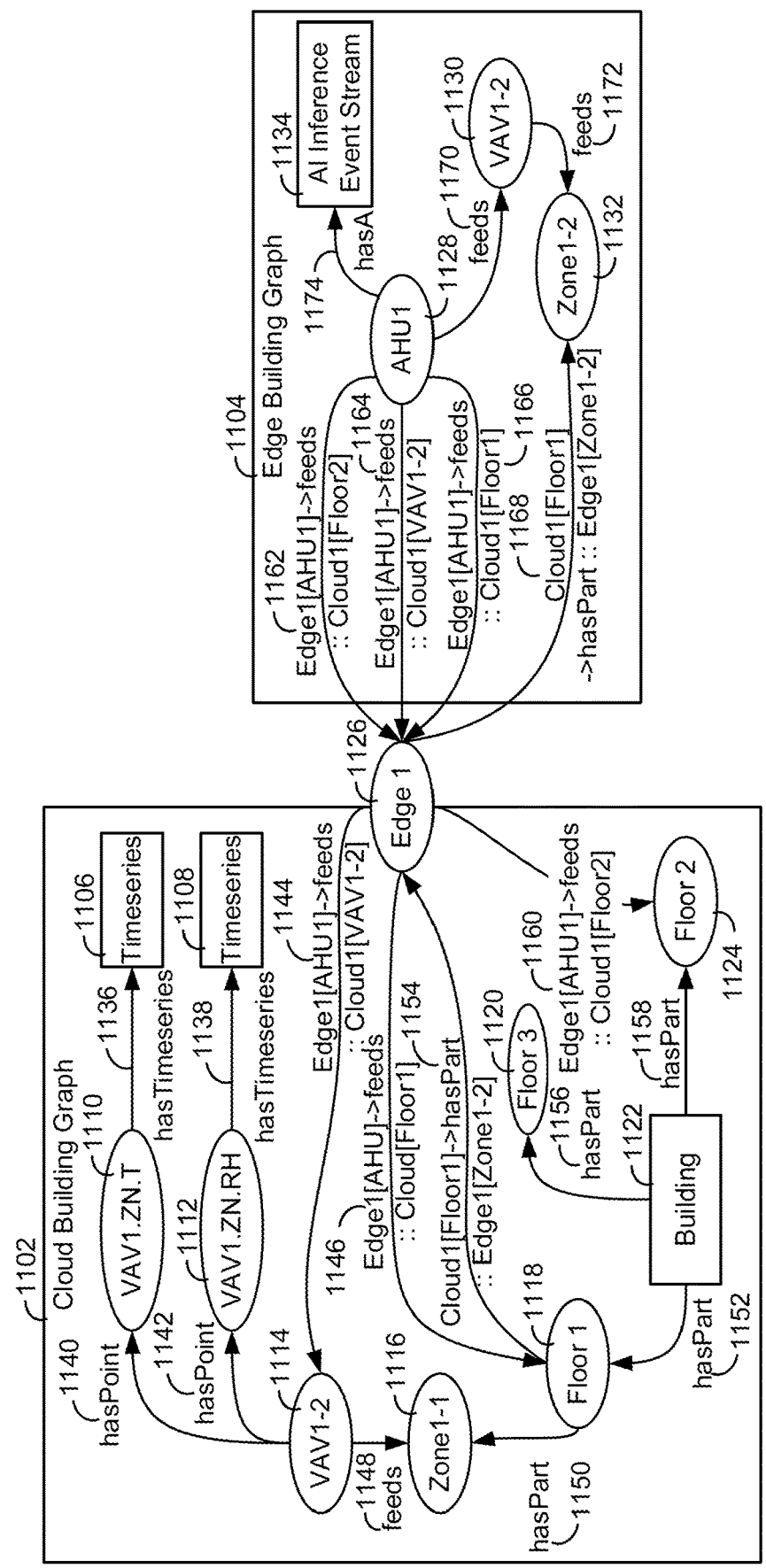
FIG. 11 is a block diagram a building graph divided and distributed across a cloud system and an edge system, according to an exemplary embodiment.
Figure 12:
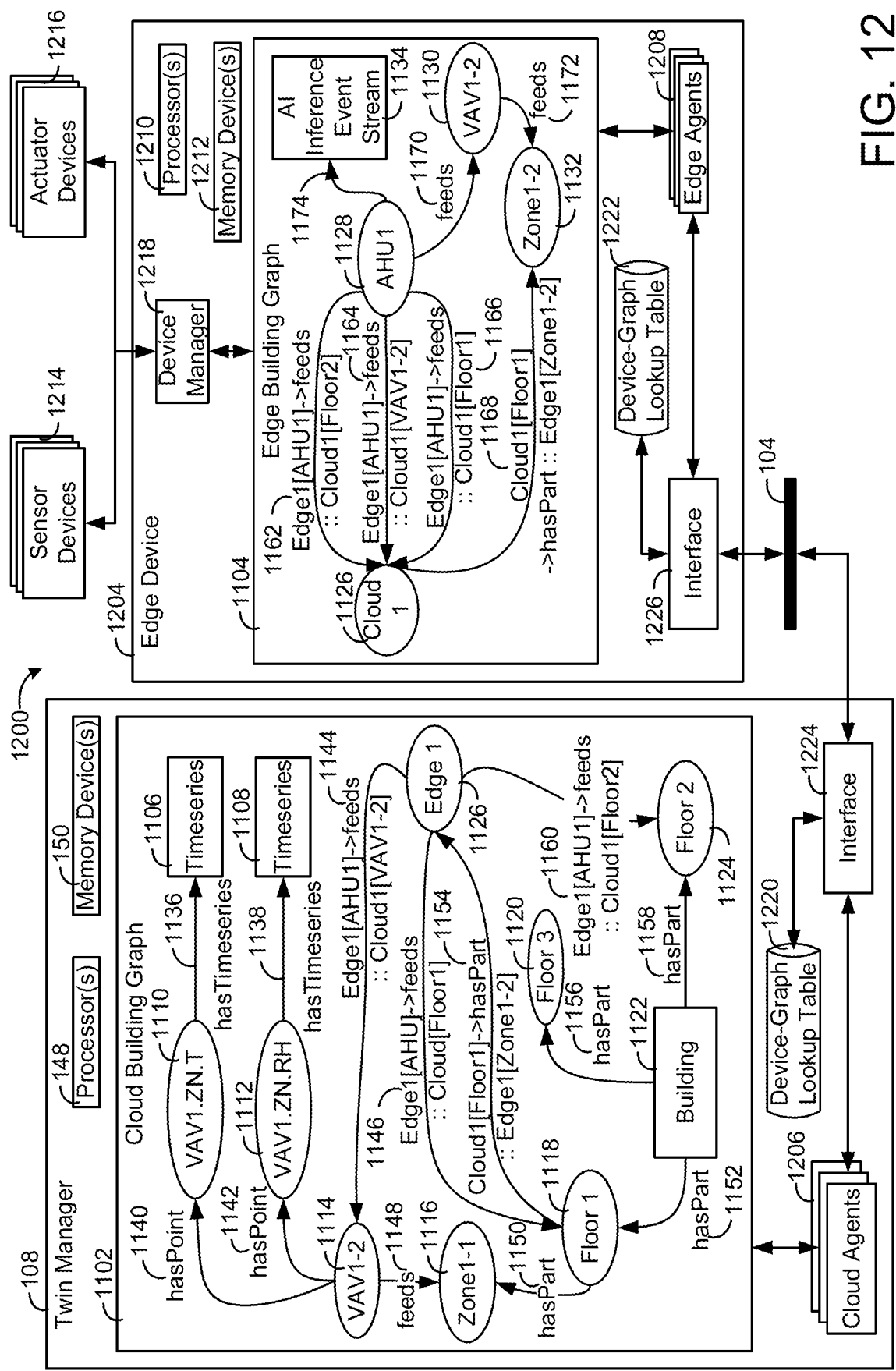
FIG. 12 is a block diagram of the twin manager of FIG. 1 and an edge device storing the building graph of FIG. 11 divided and distributed across the twin manager and the edge device, according to an exemplary embodiment.
Figure 13:
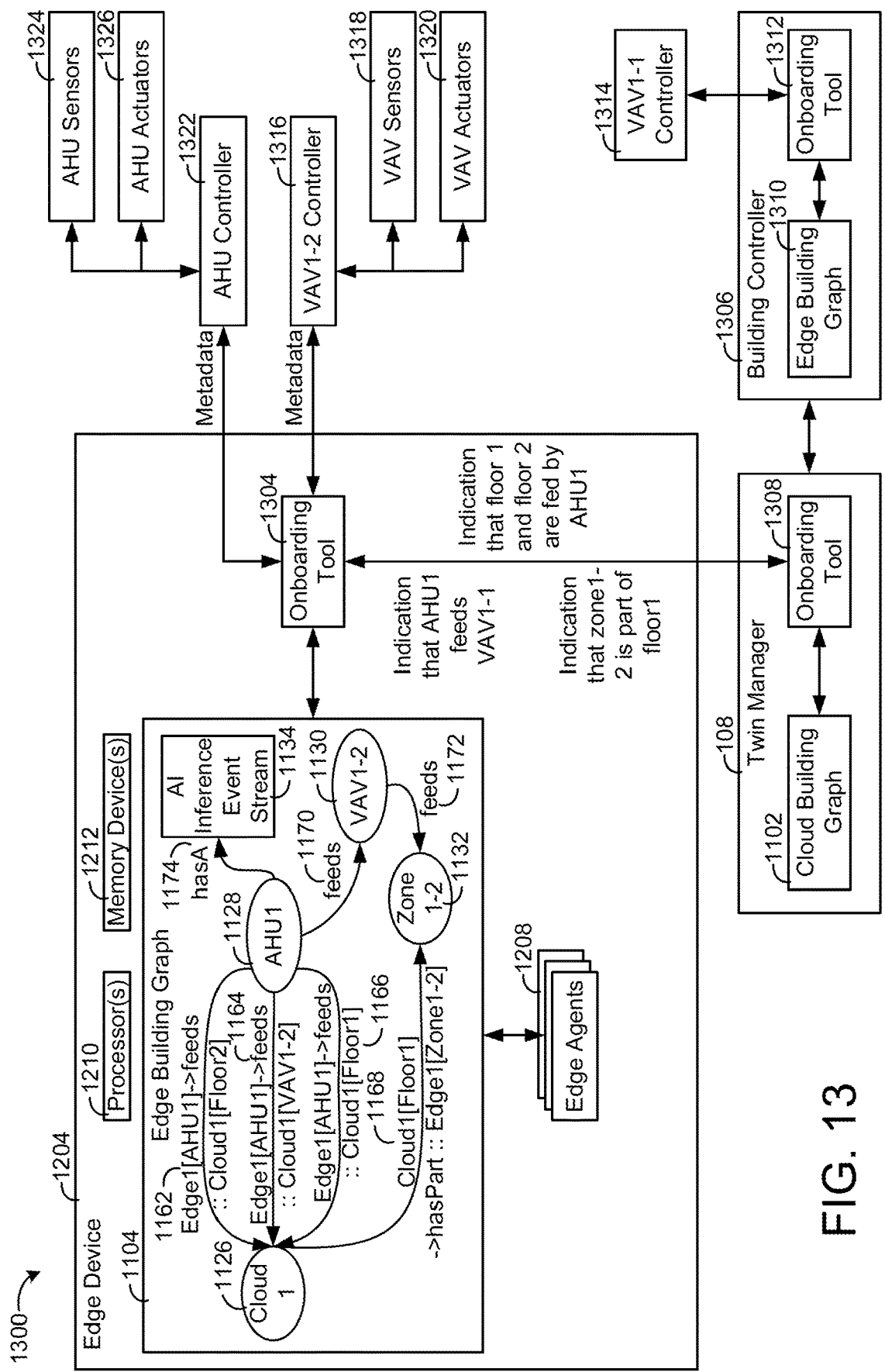
FIG. 13 is a block diagram of the distributed building graph generated across the twin manager and a building controller during an onboarding process, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region↔Building↔Floor↔Space↔Asset

For the ontology of a subscription of "Customer B," the graph projection manager 156 can create relationships based on the rule:

Building↔Floor↔Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc.

Figure 2:
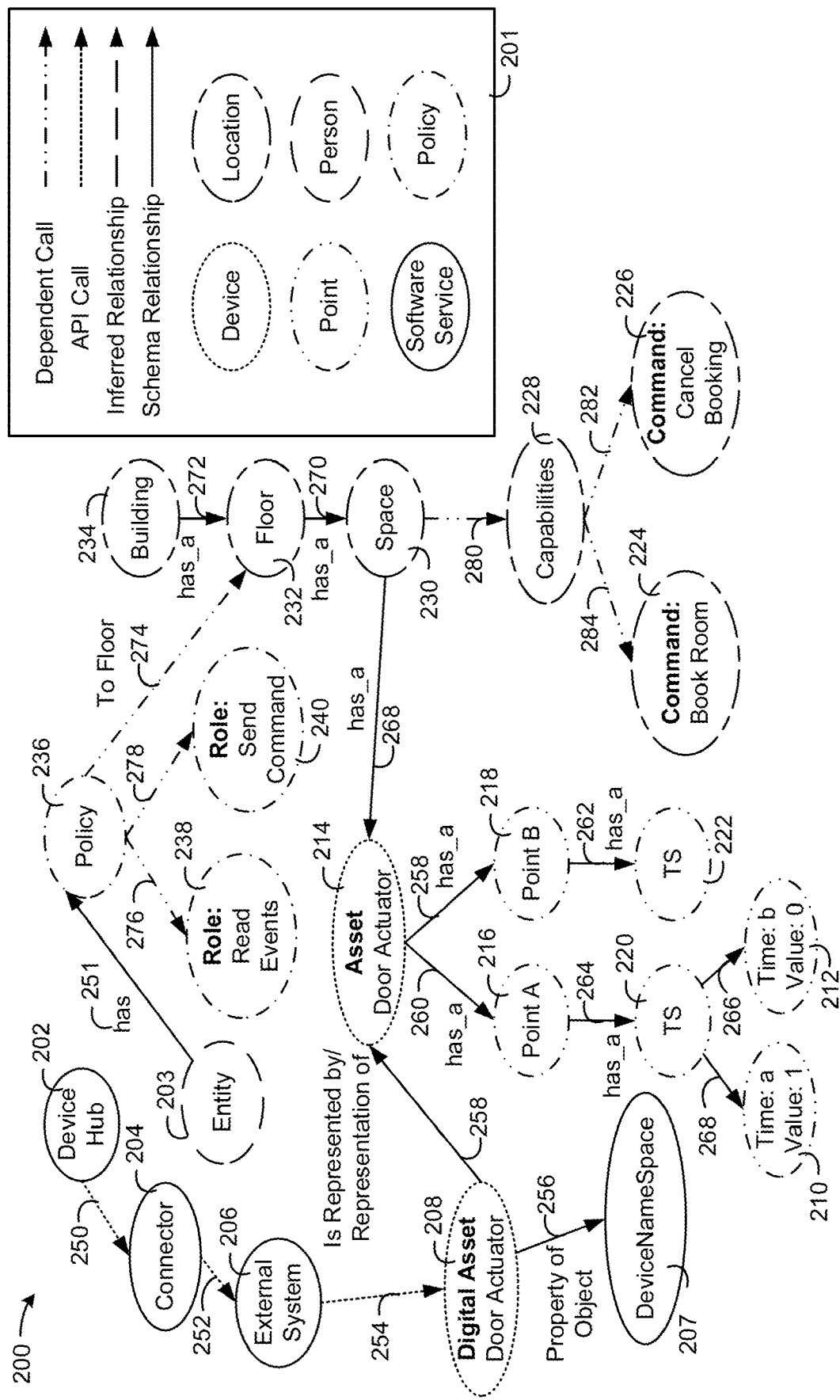
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_a" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value.

Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
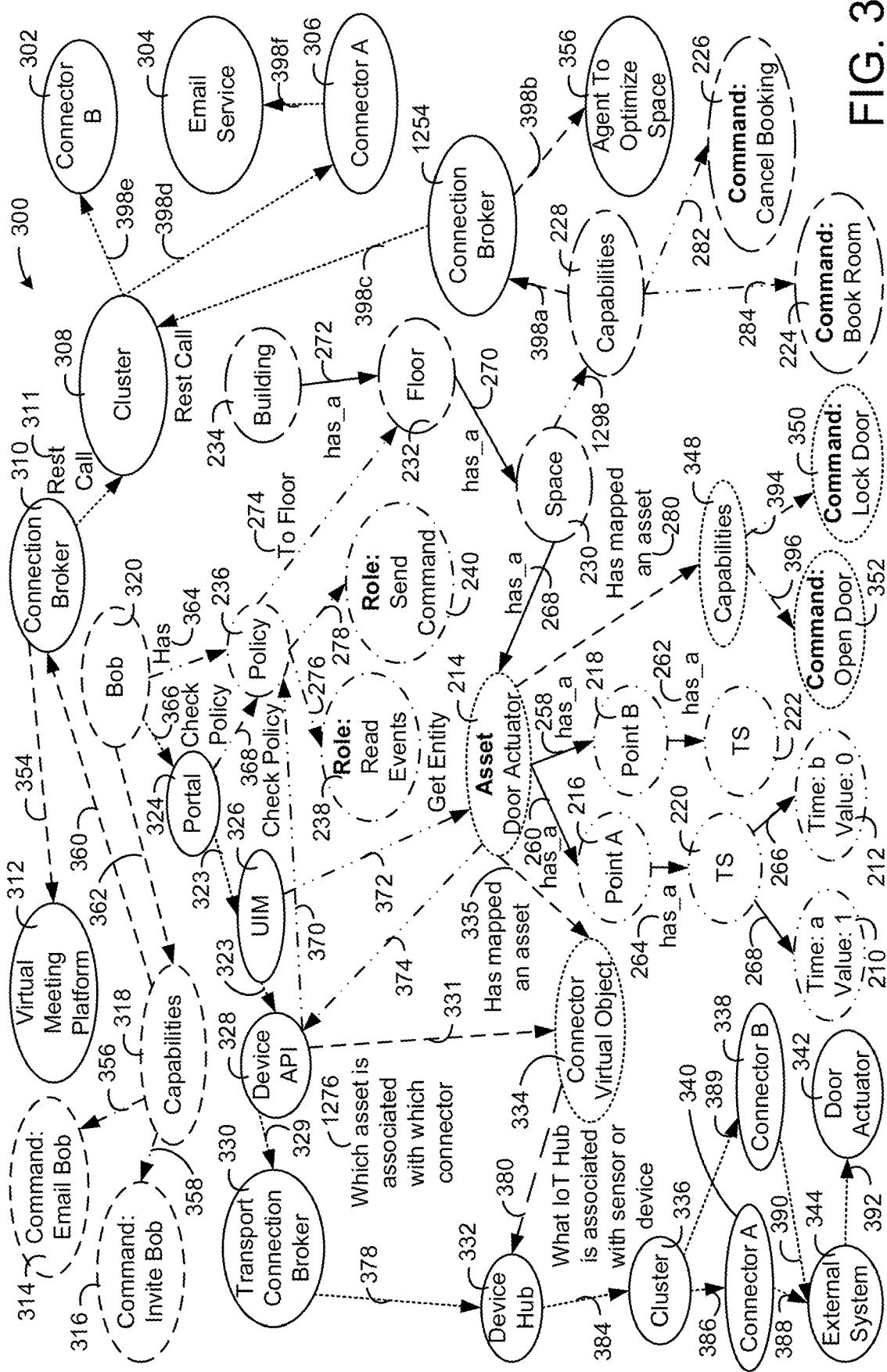
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 310 related to capabilities 228 by edge 398a. The connection broker 310 can be a node representing a software application configured to facilitate a connection with another software application. In some embodiments, the cloud platform 106 can identify the system that implements the capabilities 228 by identifying the edge 398a between the capabilities 228 and the connection broker 310.

The connection broker 310 is related to an agent that optimizes a space 356 via edge 398b. The agent represented by the node 356 can book and cancel bookings for the space represented by the node 230 based on the edge 398b between the connection broker 310 and the node 356 and the edge 398a between the capabilities 228 and the connection broker 310.

The connection broker 310 is related to a cluster 308 by edge 398c. Cluster 308 is related to connector B 302 via edge 398e and connector A 306 via edge 398d. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cluster 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
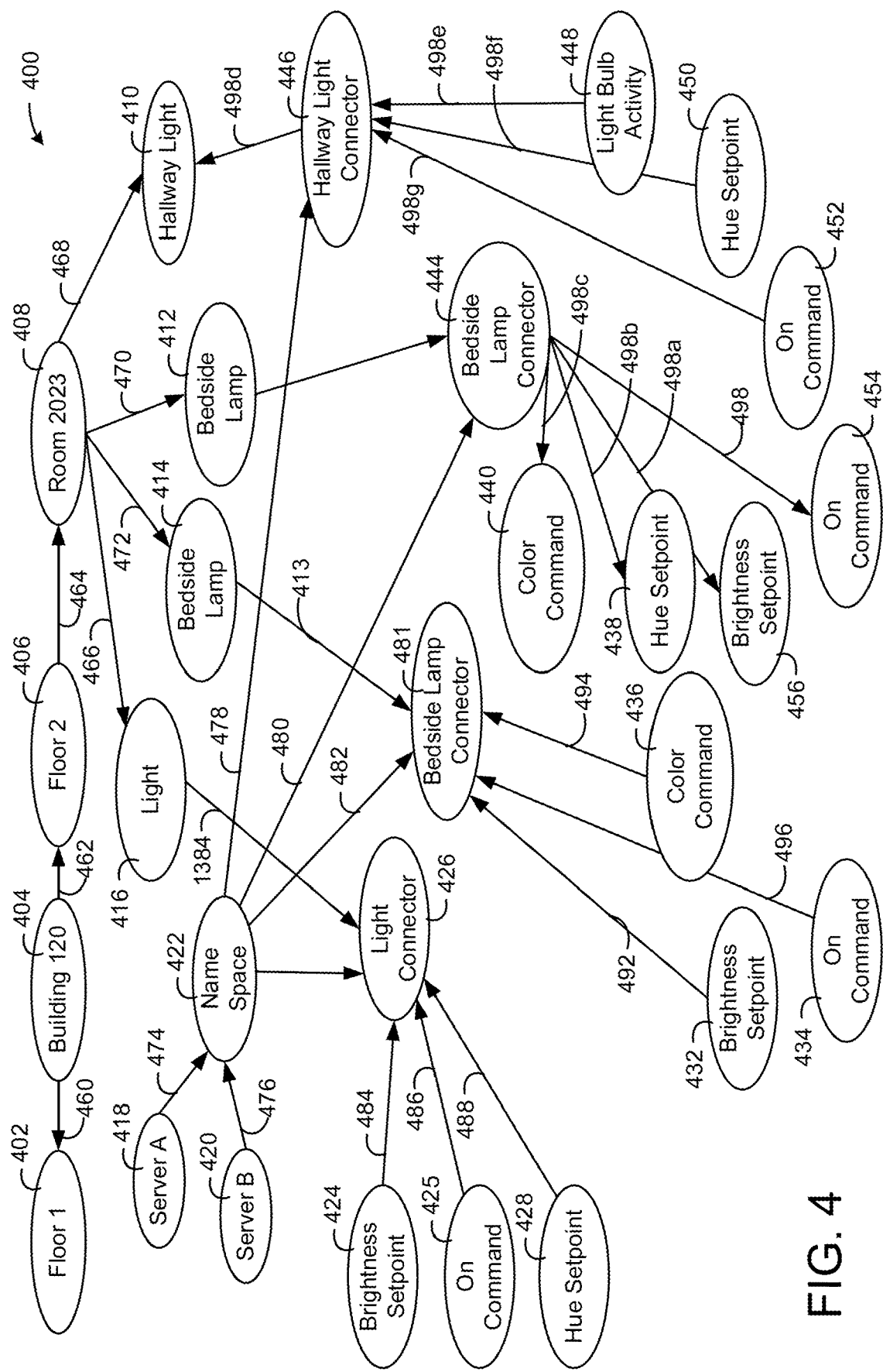
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges 498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Figure 5:
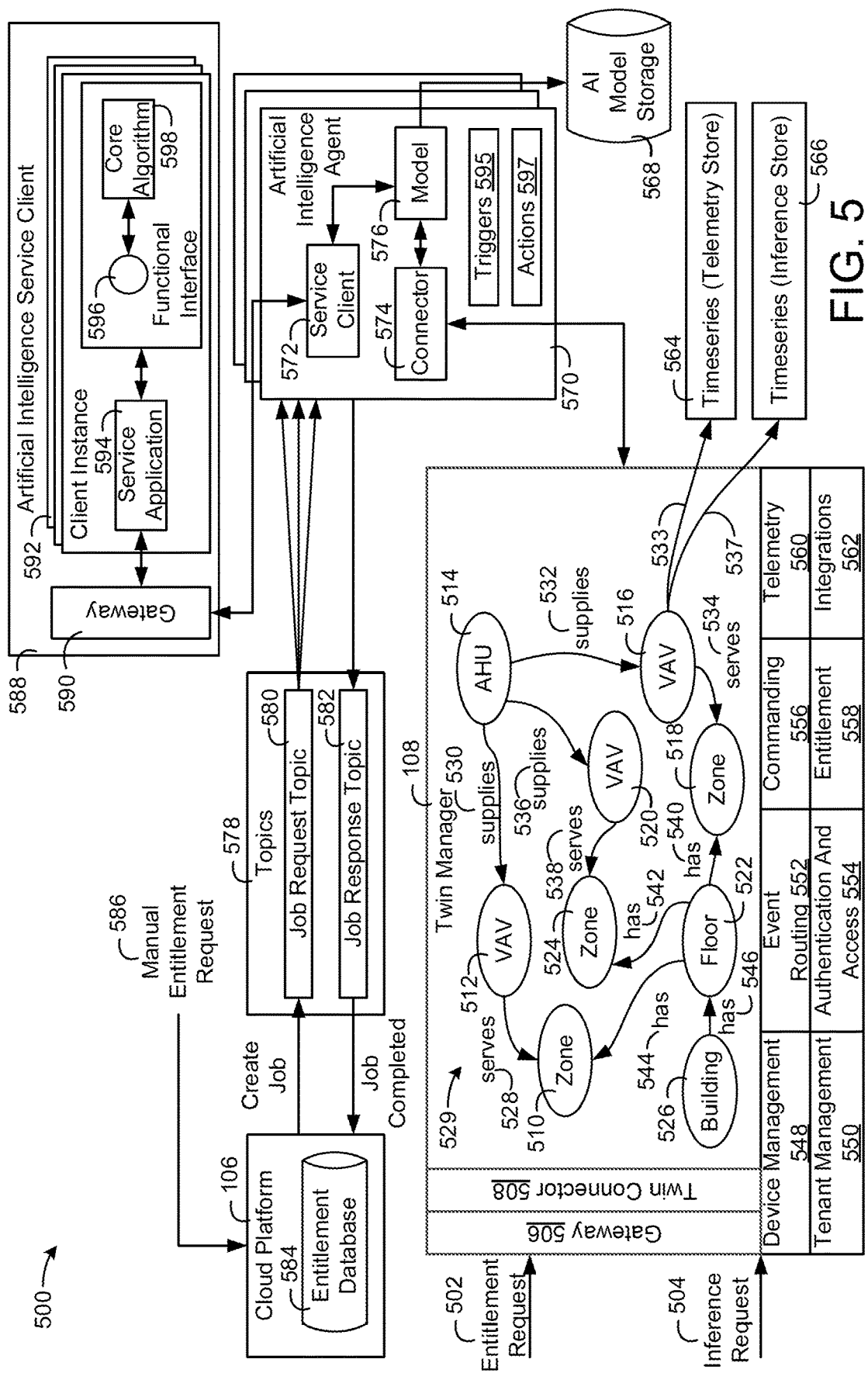
FIG. 5 is a block diagram of a system for managing a digital twin where an artificial intelligence agent can be executed to infer information for an entity of a graph, according to an exemplary embodiment.

Referring now to FIG. 5, a system 500 for managing a digital twin where an artificial intelligence agent can be executed to infer and/or predict information for an entity of a graph is shown, according to an exemplary embodiment. The system 500 can be components of the building data platform 100, e.g., components run on the processors and memories of the edge platform 102, the cloud platform 106, the twin manager 108, and/or the applications 110. The system 500 can, in some implementations, implement a digital twin with artificial intelligence.

A digital twin (or a shadow) may be a computing entity that describes a physical thing (e.g., a building, spaces of a building, devices of a building, people of the building, equipment of a building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 5, the digital twin can be a graph 529 managed by the twin manager 108 and/or artificial intelligence agents 570. In some embodiments, the digital twin is the combination of the graph 529 with the artificial intelligence agents 570. In some embodiments, the digital twin enables the creation of a chronological time-series database of telemetry events for analytical purposes. In some embodiments, the graph 529 uses the BRICK schema.

The twin manager 108 stores the graph 529 which may be a graph data structure including various nodes and edges interrelating the nodes. The graph 529 may be the same as, or similar to, the graph projections described herein with reference to FIGS. 1-4. The graph 529 includes nodes 510-526 and edges 528-546. The graph 529 includes a building node 526 representing a building that has a floor indicated by the "has" edge 546 to the floor node 522. The floor node 522 is relate to a zone node 510 via a "has" edge 544 indicating that the floor represented by the node 522 has a zone represented by the zone 510.

The floor node 522 is related to the zone node 518 by the "has" edge 540 indicating that the floor represented by the floor node 522 has another zone represented by the zone node 518. The floor node 522 is related to another zone node 524 via a "has" edge 542 representing that the floor represented by the floor node 522 has a third zone represented by the zone node 524.

The graph 529 includes an AHU node 514 representing an AHU of the building represented by the building node 526. The AHU node 514 is related by a "supplies" edge 530 to the VAV node 512 to represent that the AHU represented by the AHU node 514 supplies air to the VAV represented by the VAV node 512. The AHU node 514 is related by a "supplies" edge 536 to the VAV node 520 to represent that the AHU represented by the AHU node 514 supplies air to the VAV represented by the VAV node 520. The AHU node 514 is related by a "supplies" edge 532 to the VAV node 516 to represent that the AHU represented by the AHU node 514 supplies air to the VAV represented by the VAV node 516.

The VAV node 516 is related to the zone node 518 via the "serves" edge 534 to represent that the VAV represented by the VAV node 516 serves (e.g., heats or cools) the zone represented by the zone node 518. The VAV node 520 is related to the zone node 524 via the "serves" edge 538 to represent that the VAV represented by the VAV node 520 serves (e.g., heats or cools) the zone represented by the zone node 524. The VAV node 512 is related to the zone node 510 via the "serves" edge 528 to represent that the VAV represented by the VAV node 512 serves (e.g., heats or cools) the zone represented by the zone node 510.

Furthermore, the graph 529 includes an edge 533 related to a timeseries node 564. The timeseries node 564 can be information stored within the graph 529 and/or can be information stored outside the graph 529 in a different database (e.g., a timeseries database). In some embodiments, the timeseries node 564 stores timeseries data (or any other type of data) for a data point of the VAV represented by the VAV node 516. The data of the timeseries node 564 can be aggregated and/or collected telemetry data of the timeseries node 564.

Furthermore, the graph 529 includes an edge 537 related to a timeseries node 566. The timeseries node 566 can be information stored within the graph 529 and/or can be information stored outside the graph 529 in a different database (e.g., a timeseries database). In some embodiments, the timeseries node 566 stores timeseries data (or any other type of data) for a data point of the VAV represented by the VAV node 516. The data of the timeseries node 564 can be inferred information, e.g., data inferred by one of the artificial intelligence agents 570 and written into the timeseries node 564 by the artificial intelligence agent 570. In some embodiments, the timeseries 564 and/or 566 are stored in the graph 529 but are stored as references to timeseries data stored in a timeseries database.

The twin manager 108 includes various software components. For example, the twin manager 108 includes a device management component 548 for managing devices of a building. The twin manager 108 includes a tenant management component 550 for managing various tenant subscriptions. The twin manager 108 includes an event routing component 552 for routing various events. The twin manager 108 includes an authentication and access component 554 for performing user and/or system authentication and grating the user and/or system access to various spaces, pieces of software, devices, etc. The twin manager 108 includes a commanding component 556 allowing a software application and/or user to send commands to physical devices. The twin manager 108 includes an entitlement component 558 that analyzes the entitlements of a user and/or system and grants the user and/or system abilities based on the entitlements. The twin manager 108 includes a telemetry component 560 that can receive telemetry data from physical systems and/or devices and ingest the telemetry data into the graph 529. Furthermore, the twin manager 108 includes an integrations component 562 allowing the twin manager 108 to integrate with other applications.

The twin manager 108 includes a gateway 506 and a twin connector 508. The gateway 506 can be configured to integrate with other systems and the twin connector 508 can be configured to allow the gateway 506 to integrate with the twin manager 108. The gateway 506 and/or the twin connector 508 can receive an entitlement request 502 and/or an inference request 504. The entitlement request 502 can be a request received from a system and/or a user requesting that an AI agent action be taken by the AI agent 570. The entitlement request 502 can be checked against entitlements for the system and/or user to verify that the action requested by the system and/or user is allowed for the user and/or system. The inference request 504 can be a request that the AI agent 570 generates an inference, e.g., a projection of information, a prediction of a future data measurement, an extrapolated data value, etc.

The cloud platform 106 is shown to receive a manual entitlement request 586. The request 586 can be received from a system, application, and/or user device (e.g., from the applications 110, the building subsystems 122, and/or the user device 176). The manual entitlement request 586 may be a request for the AI agent 570 to perform an action, e.g., an action that the requesting system and/or user has an entitlement for. The cloud platform 106 can receive the manual entitlement request 586 and check the manual entitlement request 586 against an entitlement database 584 storing a set of entitlements to verify that the requesting system has access to the user and/or system. The cloud platform 106, responsive to the manual entitlement request 586 being approved, can create a job for the AI agent 570 to perform. The created job can be added to a job request topic 580 of a set of topics 578.

The job request topic 580 can be fed to AI agents 570. For example, the topics 580 can be fanned out to various AI agents 570 based on the AI agent that each of the topics 580 pertains to (e.g., based on an identifier that identifies an agent and is included in each job of the topic 580). The AI agents 570 include a service client 572, a connector 574, and a model 576. The model 576 can be loaded into the AI agent 570 from a set of AI models stored in the AI model storage 568. The AI model storage 568 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 568 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 570 can include triggers 595 and actions 597. The triggers 595 can be conditional rules that, when met, cause one or more of the actions 597. The triggers 595 can be executed based on information stored in the graph 529 and/or data received from the building subsystems 122. The actions 597 can be executed to determine commands, actions, and/or outputs. The output of the actions 597 can be stored in the graph 529 and/or communicated to the building subsystems 122.

The AI agent 570 can include a service client 572 that causes an instance of an AI agent to run. The instance can be hosted by the artificial intelligence service client 588. The client 588 can cause a client instance 592 to run and communicate with the AI agent 570 via a gateway 590. The client instance 592 can include a service application 594 that interfaces with a core algorithm 598 via a functional interface 596. The core algorithm 598 can run the model 576, e.g., train the model 576 and/or use the model 576 to make inferences and/or predictions.

In some embodiments, the core algorithm 598 can be configured to perform learning based on the graph 529. In some embodiments, the core algorithm 598 can read and/or analyze the nodes and relationships of the graph 529 to make decisions. In some embodiments, the core algorithm 598 can be configured to use telemetry data (e.g., the timeseries data 564) from the graph 529 to make inferences on and/or perform model learning. In some embodiments, the result of the inferences can be the timeseries 566. In some embodiments, the timeseries 564 is an input into the model 576 that predicts the timeseries 566.

In some embodiments, the core algorithm 598 can generate the timeseries 566 as an inference for a data point, e.g., a prediction of values for the data point at future times. The timeseries 564 may be actual data for the data point. In this regard, the core algorithm 598 can learn and train by comparing the inferred data values against the true data values. In this regard, the model 576 can be trained by the core algorithm 598 to improve the inferences made by the model 576.

Figure 6:
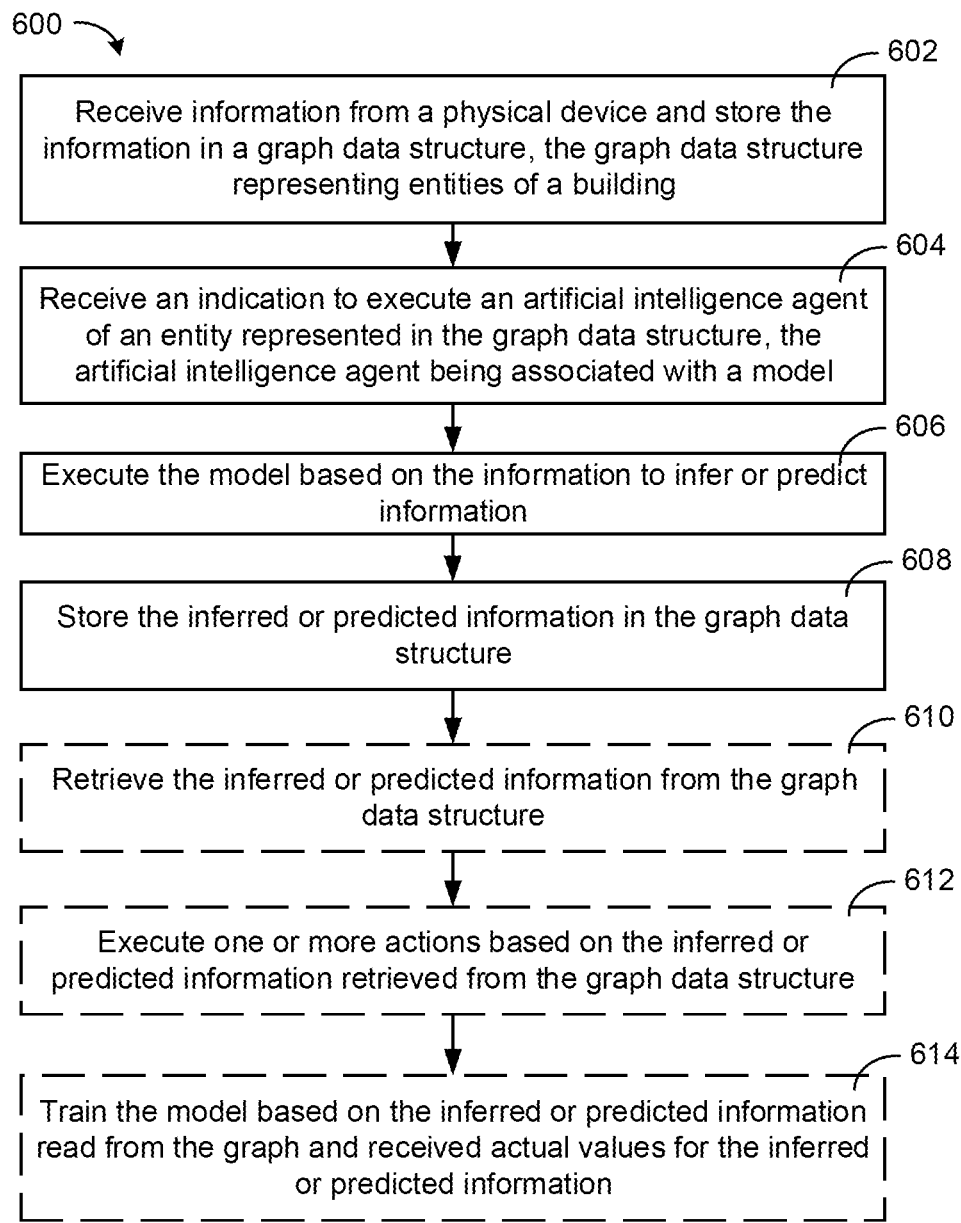
FIG. 6 is a flow diagram of a process for executing an artificial intelligence agent to infer and/or predict information, according to an exemplary embodiment.

Referring now to FIG. 6, a process 600 for executing an artificial intelligence agent to infer and/or predict information is shown, according to an exemplary embodiment. The process 600 can be performed by the system 500 and/or components of the system 500. The process 600 can be performed by the building data platform 100. Furthermore, the process 600 can be performed by any computing device described herein.

In step 602, the twin manager 108 receives information from a physical device and stores the information, or a link to the information, in the graph 529. For example, the telemetry component 560 can receive telemetry data from physical devices, e.g., the building subsystems 122. The telemetry can be measured data values, a log of historical equipment commands, etc. The telemetry component 560 can store the received information in the graph 529 by relating a node storing the information to a node representing the physical device. For example, the telemetry component 560 can store timeseries data as the timeseries 566 along by identifying that the physical device is a VAV represented by the VAV node 516 and that an edge 537 relates the VAV node 516 to the timeseries node 566.

In step 604, the twin manager 108 and/or the cloud platform 106 receives an indication to execute an artificial intelligence agent of an entity represented in the graph 529, the AI agent being associated with a model. In some embodiments, the indication is created by a user and provided via the user device 176. In some embodiments, the indication is created by an application, e.g., one of the applications 110. In some embodiments, the indication is a triggering event that triggers the agent and is received from the building subsystems 122 and/or another agent (e.g., an output of one agent fed into another agent).

In some embodiments, the AI agent is an agent for a specific entity represented in the graph 529. For example, the agent could be a VAV maintenance agent configured to identify whether a VAV (e.g., a VAV represented by the nodes 512, 520, and/or 516) should have maintenance performed at a specific time. Another agent could be a floor occupant prediction agent that is configure to predict the occupancy of a particular floor of a building, e.g., the floor represented by the floor node 522.

Responsive to receiving the indication, in step 606, the AI agent 570 causes a client instance 592 to run the model 576 based on the information received in step 602. In some embodiments, the information received in step 602 is provided directly to the AI agent 570. In some embodiments, the information is read from the graph 529 by the AI agent 570.

In step 608, the AI agent 570 stores the inferred and/or predicted information in the graph 529 (or stores the inferred and/or predicted information in a separate data structure with a link to the graph 529). In some embodiments, the AI agent 570 identifies that the node that represents the physical entity that the AI agent 570 inferred and/or predicted information for, e.g., the VAV represented by the VAV 516. The AI agent 570 can identify that the timeseries node 566 stores the inferred and/or predicted information by identifying the edge 537 between the VAV node 516 and the timeseries node 566.

In step 610, the AI agent 570 can retrieve the inferred or predicted information from the graph 529 responsive to receiving an indication to execute the model of the AI agent 570 of the inferred or predicted information, e.g., similar to the step 604. In step 612, the AI agent 570 can execute one or more actions based on the inferred and/or predicted information of the step 610 based the inferred and/or predicted information retrieved from the graph 529. In some embodiments, the AI agent 570 executes the model 576 based on the inferred and/or predicted information.

In step 614, the AI agent 570 can train the model 576 based on the inferred or predicted information read from the graph 529 and received actual values for the inferred or predicted information. In some embodiments, the AI agent 570 can train and update parameters of the model 576. For example, the timeseries 564 may represent actual values for a data point of the VAV represented by the VAV node 516. The timeseries 566 can be the inferred and/or predicted information. The AI agent 570 can compare the timeseries 564 and the timeseries 566 to determine an error in the inferences and/or predictions of the model 576. The error can be used by the model 576 to update and train the model 576.

Figure 7:
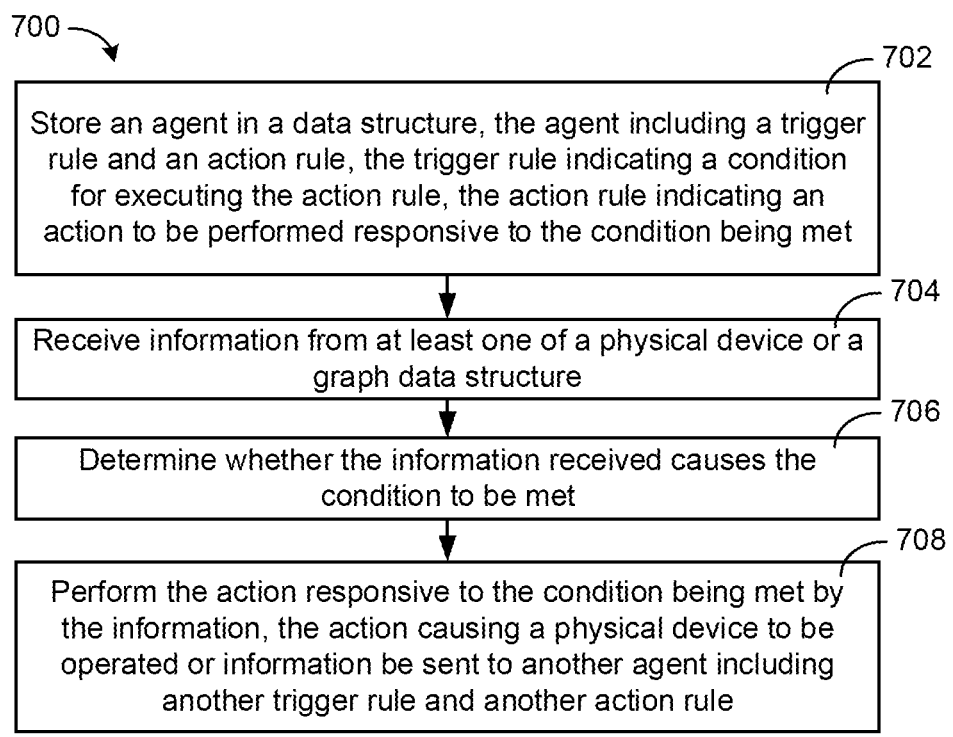
FIG. 7 is a flow diagram an agent of a digital twin executing a trigger rule and an action rule, according to an exemplary embodiment.

Referring now to FIG. 7, a process 700 of an agent executing a trigger rule and an action rule is shown, according to an exemplary embodiment. The process 700 can be performed by the system 500 and/or components of the system 500. In some embodiments, the building data platform 100 can perform the process 700. Furthermore, the process 700 can be performed by any computing device described herein.

In step 702, the building data platform can store an agent 570 in a data structure. The agent 570 can include a trigger rule indicating a condition for executing an action rule and an action rule indicating an action to be performed responsive to the condition being met. In some embodiments, the model 576 includes, or can be replaced with, the trigger rule and the action rule. The trigger rule and the action rule can be logical statements and/or conditions that include parameter values and/or create an output action.

In step 704, the agent 570 can receive information from at least one of a physical device and/or from the graph 529. The information can be generated by a physical device, e.g., the building subsystems 122. The building data platform 100 can, in some embodiments, receive the information from the physical device, ingest the information into the graph 529, and the agent 570 can read the information from the graph 529. In some embodiments, the agent 570 can check the information of the graph 529 against a trigger rule at a set period.

In step 706, the agent 570 determines whether the information received in the step 704 causes the condition to be met. The agent 570 can apply the information to the trigger rule to determine whether the trigger rule is triggered, i.e., the condition of the trigger rule being met.

In step 708, the agent 570 can perform the action responsive to the condition being met by the information determined in step 706. The action may cause a physical device to be operated or information be sent to another agent including another trigger rule and another action rule. In some embodiments, the action can be performed by executing the action rule of the agent 570. The action rule can perform an action based on one or more parameter value of the action rule. In some embodiments, the action output of the action rule can be sent directly to the physical device, e.g., the building subsystems 122. In some embodiments, the action output can be stored into the graph 529. Another operating component of the building data platform 100, e.g., the command processor 136, can read the action from the graph 529 can communicate a corresponding command to the building subsystems 122.

Figure 8:
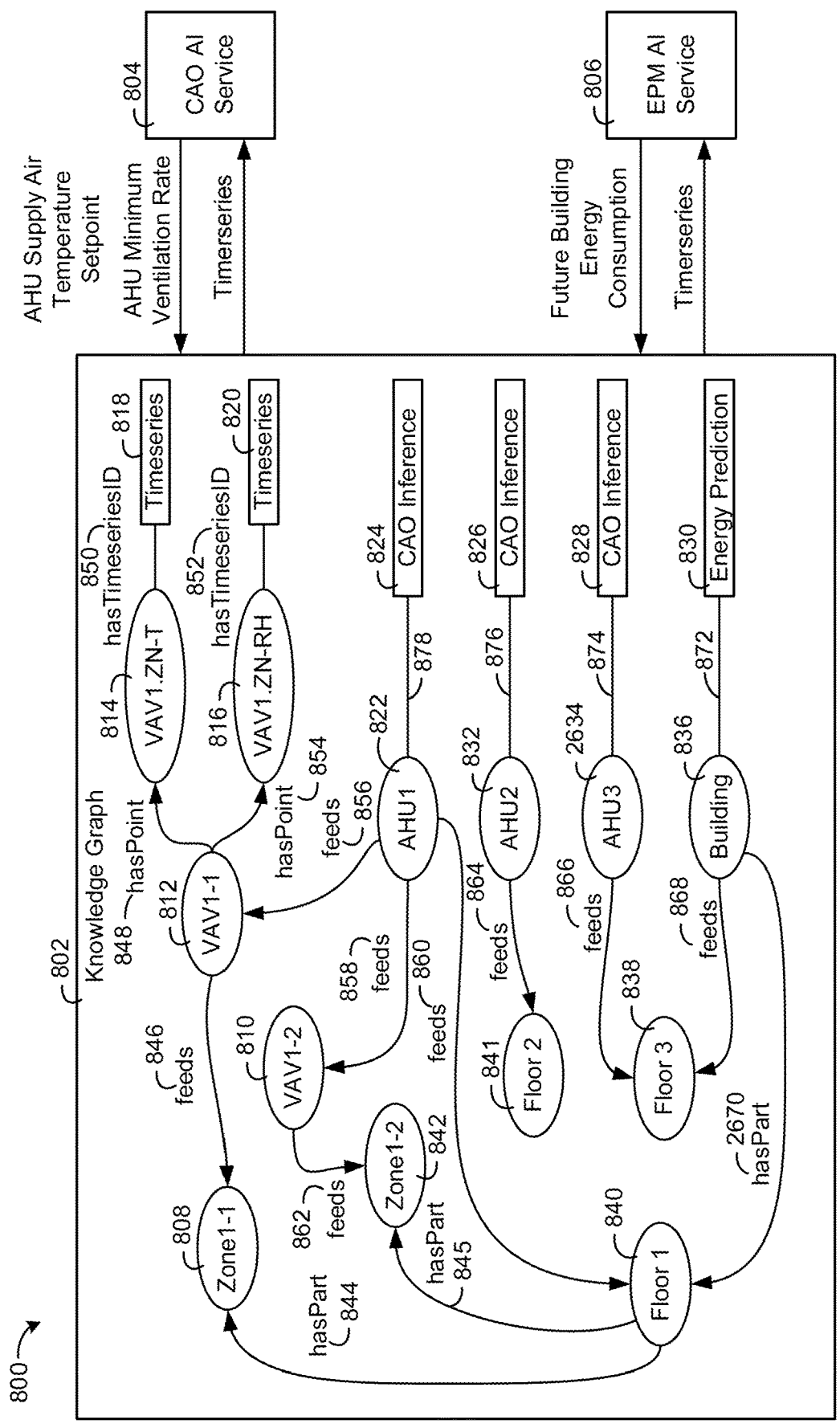
FIG. 8 is a block diagram of a system where a clean air optimization (CAO) AI service and an energy prediction model (EPM) AI service operate to make inferences and predictions based on data of a knowledge graph, according to an exemplary embodiment.

Referring now to FIG. 8, a system 800 where a clean air optimization (CAO) AI service 804 and an energy prediction model (EPM) AI service 806 operate to make inferences and predictions based on data of a knowledge graph 802 is shown, according to an exemplary embodiment. The knowledge graph 802 includes various nodes and edges. The nodes may be the nodes 808-842. The edges may be the edges 844-878.

The nodes may represent various entities of a building and/or buildings. The entities may be a campus, a building, a floor, a space, a zone, a piece of equipment, a person, a control point, a data measurement point, a sensor, an actuator, telemetry data, a piece of timeseries data, etc. The edges 844-878 can interrelate the nodes 808-842 to represent the relationships between the various entities of the building. The edges 844-878 can be semantic language based edges 844-878. The edges can include words and/or phrases that represent the relationship. The words and/or phrases can include at least one predicate, in some cases.

The knowledge graph 802 includes a building node 836 representing a building. The building can include floors, represented by the building node 836 being related to a floor 1 node 840 via an "hasPart" edge 870 and the building node 836 being related to a floor 3 node 838 via a "feeds" edge 868. The building includes an energy prediction, e.g., a value or a timeseries of values indicating energy usage of the building. This can be represented by the building node 836 being related to an energy prediction node 830 via the edge 872.

The floor 1 includes zones, indicated by the floor 1 node 840 being related to a zone1-1 node 808 via a "hasPart" edge 844 and the floor 1 node 840 being related to a zone1-2 node 842 via a "hasPart" edge 845. Furthermore, the floor 1 can be fed by a particular AHU, AHU1. This is indicated by an AHU1 node 822 being related to the floor 1 node 840 via the "feeds" edge 860. The zone1-2 can include a VAV1-2 that feeds air to it. This can be indicated by the VAV1-2 node 810 being related to the zone1-2 node 842 by the "feeds" node 862. The AHU1 can feed the VAV1-2, indicated by the AHU1 node 822 being related to the VAV1-2 node 810 by the "feeds" edge 858.

An AHU 3 can feed air to the floor 3, indicated by the "AHU3" node 834 being related to the "floor 3" node 838 by the "feeds" edge 866. The "AHU3" node 834 is related to a CAO inference 828 via an edge 874 representing that the AHU has a clean air optimization inference that could be determined by the CAO AI service 804. The knowledge graph 802 includes an AHU2 node 832. The AHU2 832 is related to a floor 2 node 841 via a "feeds" edge 864 indicating that the AHU2 feeds air to the floor 2. The AHU2 node 832 is related to a CAO inference 826 via the edge 876. The CAO inference 826 can indicate an inference made by the CAO AI service 804 for the AHU2. The AHU1 822 is related to a CAO inference 824 via edge 878. The CAO inference 824 can indicate a clean air optimization inference made by the CAO AI service 804 for the AHU1.

The knowledge graph 802 includes a VAV1-1 node 812 indicating a VAV1-1. The VAV1-1 node 812 is related to the zone1-1 node 808 via a "feeds" edge 846 indicating that the VAV1-1 feeds air to the zone1-1. The AHU1 can feed air to the VAV1-1 indicated by the AHU1 node 822 being related to the VAV1-1 node 812 via the "feeds" edge 856. The VAV1-1 node 812 includes various points, e.g., a zone temperature point (represented by the VAV1.ZN-T node 814) and a zone relative humidity point (represented by the VAV1.ZN-RH node 816). The VAV1-1 node 812 is related to the VAV1.ZN-T node 814 via the "hasPoint" edge 848. The VAV1-1 node 812 is related to the VAV1.ZN-RH node 816 via the "hasPoint" edge 854.

The VAV1.ZN-T point includes a timeseries node 818 representing and/or storing a timeseries for the zone temperature, indicated by the timeseries node 818 being related to the VAV1.ZN-T node 814 via the "hasTimeseriesID" node 850. The VAV1.ZN-RH point includes a timeseries node 820 representing and/or storing a timeseries for the zone humidity, indicated by the timeseries node 820 being related to the VAV1.ZN-RH node 816 via the "hasTimeseriesID" node 852. In some embodiments, the timeseries node 818 and the timeseries node 820 are identifiers of a particular timeseries stored in a separate timeseries database, the identifier uniquely identifying the location of the timeseries so a system can consult the knowledge graph 802 and use the identifiers to retrieve the timeseries data from the separate timeseries database.

The system 800 includes a CAO AI service 804. The CAO AI service 804 can be configured to identify timeseries that it needs to execute on. For example, if the CAO AI service 804 is executing for the AHU1, the CAO AI service 804 could identify timeseries data linked to the AHU1. The CAO AI service 804 can generate CAO inferences, e.g., can infer ideal settings for clean air. The ideal settings could be an AHU supply air temperature setpoint, an AHU minimum ventilation rate, etc. The ideal settings can be ingested into the knowledge graph 802, e.g., as the CAO inferences 824-830.

In some embodiments, the CAO AI service 804 (or an agent for the CAO AI service 804) operates on behalf of a particular entity, e.g., the AHU 1. The CAO AI service 804 can generate inferences with data of the AHU 1, e.g., by identifying timeseries data of the AHU 1 by identifying timeseries nodes of the knowledge graph 802 via an edge.

The inferences can be ingested into the knowledge graph 802 by generating a new node and/or adding an edge between the new node and the node of the AHU 1, AHU 1 node 822. Similarly, the inferences can be added to the knowledge graph 802 by updating an existing node related to the AHU 1 node 822 via an existing edge. In some embodiments, the inferences of the CAO AI service 804 can generate a recommendation, e.g., a control setting for improving or optimizing air quality, which can be reviewed and approved by a user via the user device 176.

The EPM AI service 806 can generate energy predictions for various buildings, spaces, or devices of a building, e.g., entities of the knowledge graph 802. For example, the EPM AI service 806 could predict a future energy consumption level of the building 836, e.g., a future energy demand. The energy prediction can be a node 830 related to the building node 836 via the edge 872. In some embodiments, the EPM AI service 806 can generate the energy prediction node 830 responsive to generating the future building energy consumption and cause the node 830 to include a value for the future building energy consumption. The node 830 can be added to the graph 802 and the edge 872 can be generated by the EPM AI service 806 and added between the building node 836 and the energy prediction 830.

In some embodiments, the energy prediction node 830 already exists within the knowledge graph 802. In this example, the EPM AI service 806 can identify the energy prediction node 830 by identifying an edge 872 between the building 836 and the energy prediction node 830. The EPM AI service 806 can then ingest the energy prediction into the node 830.

Figure 9:
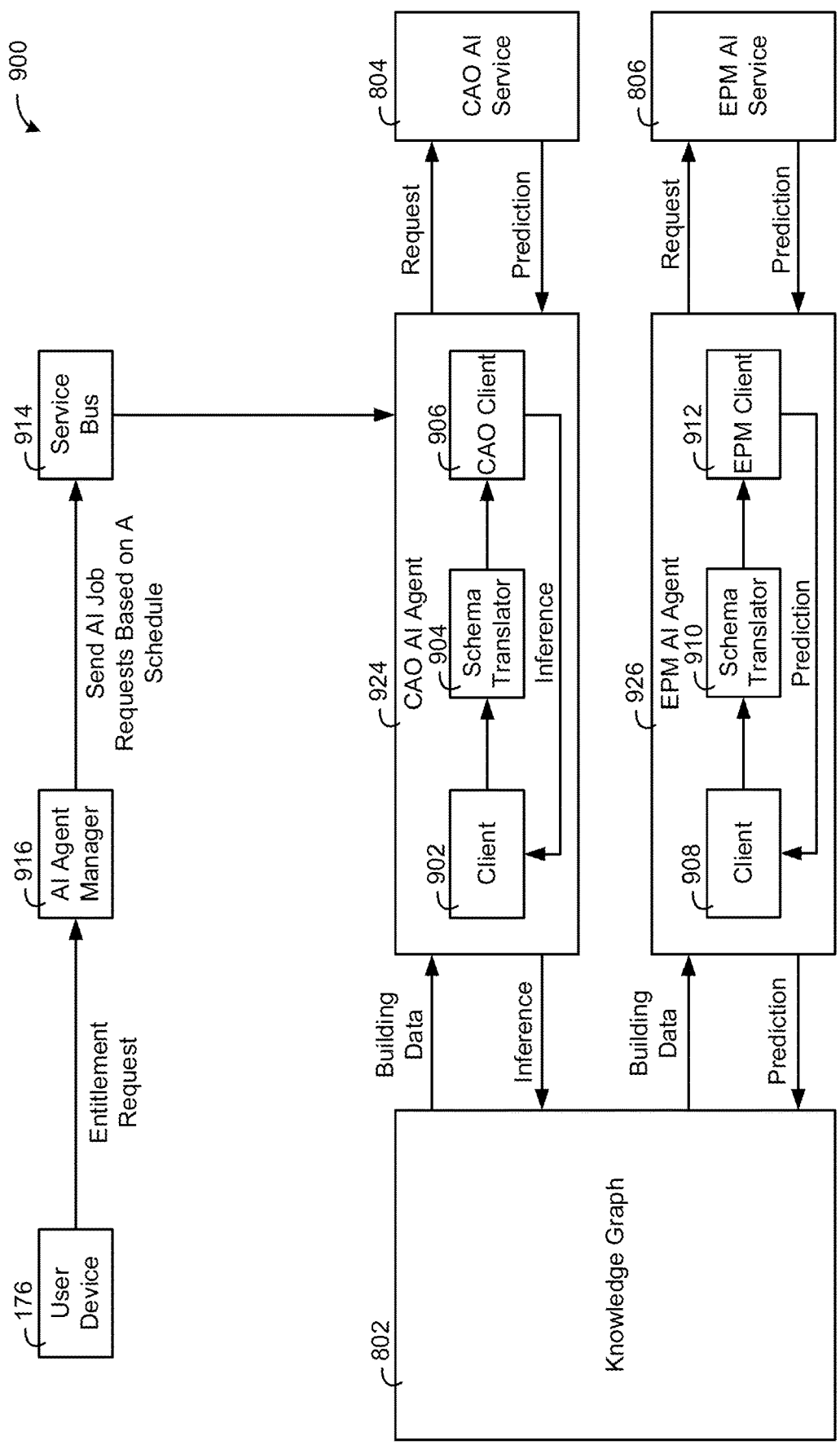
FIG. 9 is a block diagram of a CAO AI agent and an EPM AI agent operating against the knowledge graph of FIG. 26 to generate inferences and predictions, according to an exemplary embodiment.

Referring now to FIG. 9, a system 900 including a CAO AI agent 924 and an EPM AI agent 926 operating against the knowledge graph 802 to generate inferences and predictions is shown, according to an exemplary embodiment. The system 900 can be implemented on one or more processing circuits, e.g., as instructions stored on one or more memory devices and executed on one or more processors. The memory devices and processors may be the same as or similar to the memory devices and processors described with reference to FIG. 1.

The CAO AI agent 924 can operate on behalf of the CAO AI service 804. Similarly, the EPM AI agent 926 can operate on behalf of the EPM AI service 806. Furthermore a service bus 914 can interface with the agent 924 and/or the agent 926. A user can interface with the agents 924-926 via the user device 176. The user can provide an entitlement request, e.g., a request that the user is entitled to make and can be verified by the AI agent manager 916. The AI agent manager 916 can send an AI job request based on a schedule to the service bus 914 based on the entitlement request. The service bus 914 can communicate the AI job request to the appropriate agent and/or communicate results for the AI job back to the user device 176.

In some embodiments, the CAO AI agent 924 can provide a request for generating an inference to the CAO AI service 804. The request can include data read from the knowledge graph 802, in some embodiments.

The CAO AI agent 924 includes a client 902, a schema translator 904, and a CAO client 906. The client 902 can be configured to interface with the knowledge graph 802, e.g., read data out of the knowledge graph 802. The client 902 can further ingest inferences back into the knowledge graph 802. For example, the client 902 could identify timeseries nodes related to the AHU1 node 2622, e.g., timeseries nodes related to the AHU1 node 2622 via one or more edges. The client 902 can then ingest the inference made by the CAO AI agent 924 into the knowledge graph 802.

The client 902 can provide data it reads from the knowledge graph 802 to a schema translator 904 that may translate the data into a specific format in a specific schema that is appropriate for consumption by the CAO client 906 and/or the CAO AI service 804. The CAO client 906 can run one or more algorithms, software components, machine learning models, etc. to generate the inference and provide the inference to the client 902. In some embodiments, the client 906 can interface with the EPM AI service 806 and provide the translated data to the EPM AI service 806 for generating an inference. The inference can be returned by the EPM AI service 806 to the CAO client 906.

The EPM AI agent 926 can operate in a similar manner to the CAO AI agent 924, in some embodiments. The client 908 can retrieve data from the knowledge graph 802 and provide the data to the schema translator 910. The schema translator 910 can translate the data into a readable format by the CAO AI service 804 and can provide the data to the EPM client 912. The EPM client 912 can provide the data along with a prediction request to the CAO AI service 804. The CAO AI service 804 can generate the prediction and provide the prediction to the EPM client 912. The EPM client 912 can provide the prediction to the client 908 and the client 908 can ingest the prediction into the knowledge graph 802.

In some embodiments, the knowledge graph 802 includes data necessary for the inferences and/or predictions that the agents 924 and 926 generate. For example, the knowledge graph 802 can store information such as the size of a building, the number of floors of the building, the equipment of each floor of the building, the square footage of each floor, square footage of each zone, ceiling heights, etc. The data can be stored as nodes in the knowledge graph 802 representing the physical characteristics of the building. In some embodiments, the EPM AI agent 926 makes the predictions based on the characteristic data of the building and/or physical areas of the building.

Figure 10:
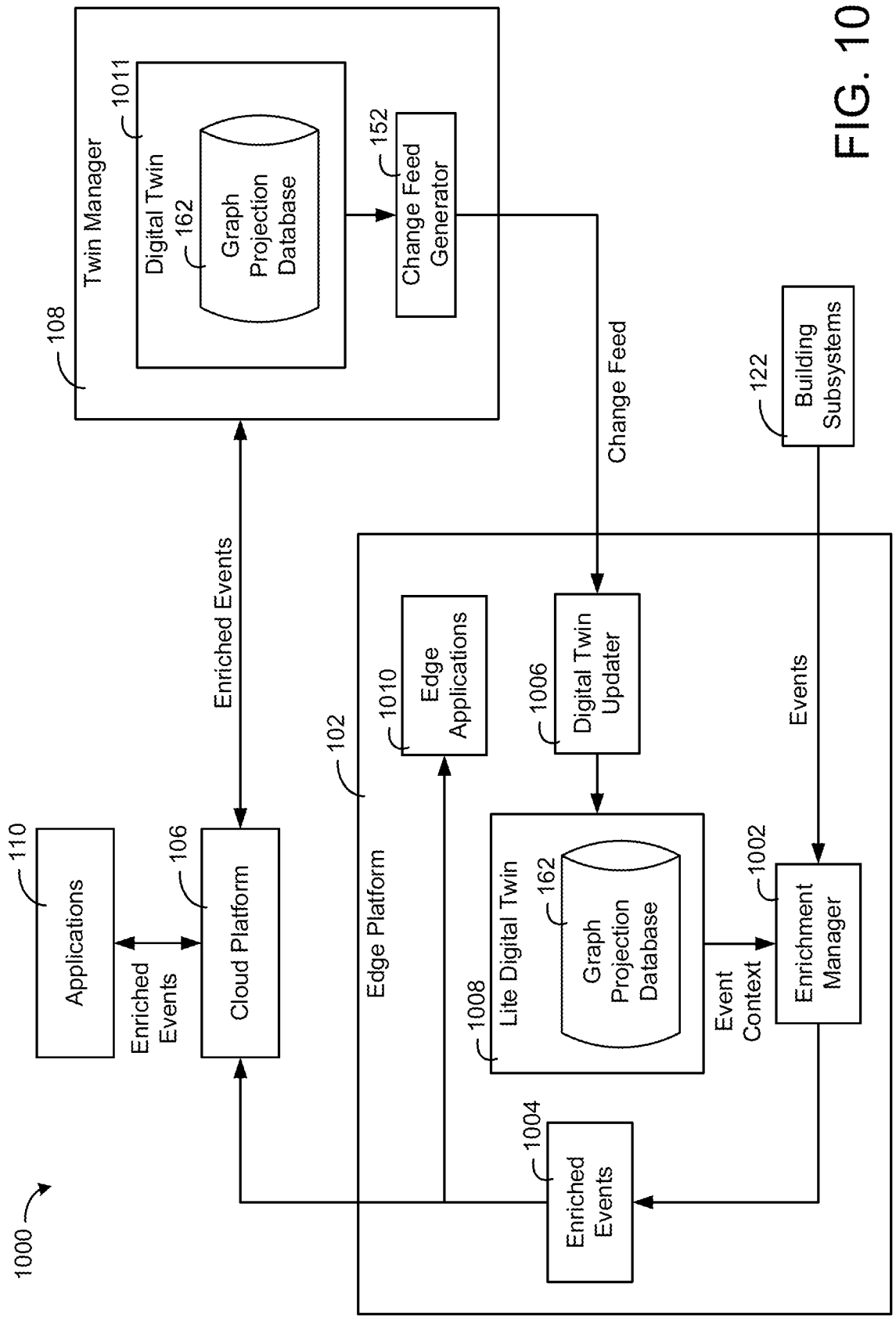
FIG. 10 is a block diagram of the edge platform of FIG. 1 performing event enrichment at the edge before the events are communicated to the cloud, according to an exemplary embodiment.

Referring now to FIG. 10, a system 1000 including the edge platform 102 performing event enrichment at the edge platform 102 before the events are communicated to the cloud platform 106 is shown, according to an exemplary embodiment. The system 1000 includes the building subsystems 122, the edge platform 102, the cloud platform 106, the applications 110, and the twin manager 108. The edge platform 102 can receive events from the building subsystems 122 and enrich the events before passing the events on to the cloud platform 106. Because the edge platform 102 is located on-premises, e.g., on the edge, the events can be enriched before being passed on to other cloud systems and/or used in edge based analytics run on the edge platform 102. In some embodiments, processors, memory devices, and/or networking devices of the edge platform 102 are located on-premises within a building.

The edge platform 102 can receive events from the building subsystems 122. The events can be data packages describing an event that has occurred with a timestamp of when the event occurred. The events can be raw events that are composed of content that is emitted from a producing system. However, the event may not include any intent or knowledge of the system that consumes it. The event can be of a particular event type. An enrichment manager 1002 of the edge platform 102 can receive the events from the building subsystems 122. The enrichment manager 1002 can be the same as, or similar to, the enrichment manager 138.

The enrichment manager 1002 can enrich the events received from the building subsystems 122 based on event context received and/or retrieved from a lite digital twin 1008 of the edge platform 102. For example, the enrichment manager 1002 can add entity and/or entity relationship information associated with the event to the event to generate the enriched events 1004. The event enrichment can be the same as or similar to the enrichment described with referenced to FIGS. 1-3 and FIG. 8. The enriched events 1004 can be an event with additional added properties or attributes that provide context regarding the event.

In some embodiments, the enrichment manager 1002 includes multiple event streams. The event streams can be data enrichment processing streams for particular events and/or particular types of events. Each event stream can be linked to a tenant and/or tenant subscription. Each event stream can indicate one or more rules for enriching an event, e.g., an indication of the information to add to the event. In this regard, one event can be applied to multiple event streams and receive different enrichments to generate multiple enriched events. Each enriched event can be provided to a different application or end system.

The edge platform 102 includes edge applications 1010. The edge applications 1010 can be similar to or the same as the applications 110. While the applications 110 may be run on a cloud system, the edge applications 1010 can be run locally on the edge platform 102. The edge applications 1010 can operate based on the enriched events 1004 and may not need to consult a digital twin to acquire context regarding an event since the enriched events 1004 may already include the needed context. In some embodiments, the edge application 1010 performs analytics (e.g., aggregation, data monitoring, etc.), control algorithms, etc. for the building subsystems 122.

For example the edge applications 1010 can generate control decisions for the building subsystems 122 based on the enriched events 1004, e.g., temperature setpoints for zones, fan speed settings for fans, duct pressure setpoints, ventilation commands, etc. In some embodiments, the edge applications 1010 include models, e.g., machine learning models for predicting characteristics and/or conditions and/or for operating the building subsystems 122. In some embodiments, the machine learning is performed at the edge platform 102 which results in higher scores than machine learning performed in the cloud since a greater amount of data can be collected faster and used for training at the edge.

In some embodiments, the enrichment manager 1002 only operates when the twin manager 108 is not operating and enriching events. For example, the edge platform 102 can receive an indication that there is an error with cloud systems, e.g., network issues, computing issues, etc. In this regard, the edge platform 102 can take over enriching the events with the enrichment manager 1002 and operating on the events with the edge applications 1010. In this regard, the enrichment and application operation can dynamically move between the edge platform 102 and the cloud platform 106. Furthermore, load balancing can be implemented so that some events are enriched and operated on by edge applications 1010 while other events are passed to the cloud platform 106 and/or the twin manager 108 for enrichment and provided to the applications 110 for operation.

In some embodiments, by performing enrichment at the edge platform 102, analytics can be performed at the edge platform 102 based on the enriched events. In this regard, lower latencies can be realized since analytics and/or control algorithms can be performed quickly at the edge platform 102 and data does not need to be communicated to the cloud. In some embodiments, the edge applications 1010 and/or machine learning models of the edge applications 1010 can be built in the cloud and communicated to the edge platform 102 and additional learning can be performed at the edge platform 102.

The edge platform 102 includes the lite digital twin 1008. The lite digital twin 1008 can be a version of a digital twin 1011 of the twin manager 108. The digital twins 1011 and/or 1008 can be virtual representations of a building and/or the building subsystems 122 of the building. The digital twin 1011 and/or the digital twin 1008 can be or can include the graph projection database 162, e.g., one or more graph data structures. The digital twin 1011 and/or the lite digital twin 1008 can be the graphs shown in FIGS. 11-13. In some embodiments, the lite digital twin 1008 is a projection that does not include all nodes and edges of a full projection graph. The lite digital twin 1008 may only include the nodes or edges necessary for enriching the events and can be built on projection rules that define the information needed that will be used to enrich the events.

In some embodiments, the lite digital twin 1008 can be synchronized, in whole or in part, with the digital twin 1011. The lite digital twin 1008 can include less information than the digital twin 1011, e.g., less nodes or edges. The lite digital twin 1008 may only include the nodes and/or edges necessary for enriching events of the building subsystems 122. In some embodiments, changes or updates to the digital twin 1011 can be synchronized to the lite digital twin 1008 through a change feed of change feed events. The change feed can indicate additions, removals, and/or reconfigurations of nodes or edges to the graph projection database 162. Each change feed event can indicate one update to the digital twin 1011.

A digital twin updater 1006 can receive the events of the change feed from the change feed generator 152 and update the lite digital twin 1008 based on each change feed event. The updates made to the lite digital twin 1008 can be the same updates as indicated by the events of the change feed. In some embodiments, the digital twin updater 1006 can update the lite digital twin 1008 to only include the nodes and edges necessary for enrichment of the events, and thus include less nodes and edges than the digital twin 1011.

In some embodiments, the digital twin updater 1006 filters out change feed events if the change feed events do not pertain to information needed to enrich the events. In this regard, the digital twin updater 1006 can store a list of information needed for enrichment, e.g., the digital twin updater 1006 can include all event subscriptions or enrichment rules. The digital twin updater 1006 can determine whether a change feed event updates information pertaining to event enrichment and only update the lite digital twin 1008 responsive to determining that the change feed event updates information needed for enrichment. In some embodiments, when a new event subscription and/or new enrichment rule is created, the digital twin updater 1006 can communicate with the digital twin 1011 to retrieve noes or edges needed for the new event subscription and/or enrichment rules.

Referring now to FIG. 11, a building graph 1100 divided and distributed across a cloud system and an edge system is shown, according to an exemplary embodiment. The building graph 1100 can form a hybrid knowledge graph (e.g., a graph data structure) which may be part of, or form, a digital twin. The hybridization of the building graph 1100 can allow for various applications to run against the building graph 1100 on edge systems, in cloud systems, or in a combination of edge systems and cloud systems. In some embodiments, the building graph 1100 can be divided up based on space or building. For example, edge systems of one space might have a building graph for the one space while edge systems for another space might have a building graph for the other space. In some embodiments, the building graph 1100 is divided up based on the operational requirements of various edge systems and cloud systems, e.g., a portion of the building graph 1100 may be stored and operated on each edge system or cloud system that allows each edge system or cloud system to perform its operations.

The building graph 1100 includes a cloud building graph 1102 and an edge building graph 1104. The cloud building graph 1102 can be stored by a cloud system, in some embodiments. The edge building graph 1104 can be stored by an edge system, in some embodiments, examples of the cloud system and the edge system are provided in FIG. 12. The building graphs 1102 and 1104 can be the same as, or similar to, the building graphs described in FIGS. 1-5 and 8.

By dividing the building graph 1100 into parts (e.g., the graph 1102 and the graph 1104) and distributing the parts across various locations provides privacy and security advantages. Because the building graph 1100 is divided and distributed, for a hacker or other entity to gain access to the entire building graph 1100, multiple separate devices (and the security systems of each device) may need to first be compromised. Requiring multiple different devices to be compromised before the entire building graph 1100 is compromised can increase the difficulty of compromising the building graph 1100. Furthermore, by distributing parts of the building graph 1100, privacy can be established. In some embodiments, the information of each graph being stored separately can allow for sensitive information to reside in one device with less sensitive information residing in a different device. This allows for the location of information to be controlled to make sure that private information is only stored in locations that a user or entity desires (e.g., locations with high security).

The cloud building graph 1102 and the edge building 1104 include various nodes, i.e., nodes 1106-1134. The cloud building graphs 1102 and 1104 further includes edges connecting the various nodes 1106-1134, e.g., edges 1136-1174. The nodes 1106-1134 can represent buildings, spaces, systems, devices, people, state data, timeseries data, sensor measurements, event data, inferred information, event streams, and/or any other type of data. The edges 1136-1174 can represent directional or bidirectional relationships between the nodes 1106-1134. In some embodiments, the edges 1136-1174 include semantic language based relationships that include one or more predicates, nouns, and/or prepositions that describe a relationship type. In some embodiments, the cloud building graph 1102 and/or the edge building graph 1104 are formatted according to a specific schema, e.g., the BRICK schema. In some embodiments, the nodes and edges stored by the cloud building graph 1102 and the edge building graph 1104 are different. In some embodiments, there is overlap between the nodes and edges stored by the cloud building graph 1102 and the edge building graph 1104.

In some embodiments, the cloud building graph 1102 includes a building node 1122. The building node 1122 can represent a particular building, e.g., a school, a hospital, a commercial business office, a high rise, an apartment, etc. The cloud building graph 1102 includes a floor 2 node 1124 related to the building node 1122 by a "hasPart" node 1158. This indicates that the building has a second floor, floor 2. The building node 1122 is related to a floor 3 node 1120 by a "hasPart" edge 1156. This indicates that the building includes a third floor, floor 3. Furthermore, the building node 1122 is related to a floor 1 node 1118 by a "hasPart" edge 1152. This indicates that the building has a first floor, floor 1.

The floor 1 node 1118 is related to a zone1-1 node 1116 by a "hasPart" edge 1150. This indicates that the first floor, floor 1, has a first zone, zone1-1. The zone1-1 node 1116 is related to a VAV1-2 node 1114 by a "feeds" edge 1148. This indicates that a particular VAV, VAV1-2, operates to feed air to the zone1-1. The VAV1-2 is associated with two different points and timeseries. The VAV1-2 node 1114 is related by a "hasPoint" edge 1140 to a zone temperature point, VAV1.ZN.T node 1110. The VAV1.ZN.T node 1110 is related by a "hasTimeseries" edge 1136 to a timeseries node 1106. This indicates that the zone temperature point includes an associated timeseries of zone temperature measurements made by the VAV1-2 or another system associated with the zone1-1 (e.g., a sensor or thermostat). The VAV1-2 node 1114 is related by a "hasPoint" edge 1142 to a zone humidity point, VAV1.ZN.RH node 1112. The VAV1.ZN.RH node 1112 is related by a "hasTimeseries" edge 1138 to a timeseries node 1108. This indicates that the zone humidity point includes an associated timeseries of zone humidity measurements made by the VAV1-2 or another system associated with the zone1-1 (e.g., a sensor or thermostat). In some embodiments, the timeseries node 1106 and/or the timeseries node 1108 (or the timeseries data associated with the nodes) are stored in a separate timeseries database and related to the graph 1102 by an identifier.

The edge building graph 1104 includes an AHU1 node 1128 representing an AHU of the building. The AHU1 node 1128 is related to a VAV1-2 node 1130 by a "feeds" edge 1170. This indicates that the AHU1 feeds air to the VAV1-2. The VAV1-2 node 1130 is related to a zone1-2 node 1132 by a "feeds" edge 1172. This indicates that the VAV1-2 node 1130 feeds air to the zone1-2. The AHU1 node 1128 is related by a "hasA" edge 1174 to an artificial intelligence (AI) inference event stream node 1134. The AI inference event stream node 1134 can store (or include an identifier linking to a separate data storage system) inferred events generated by an AI service. The event stream could be inferred weather conditions, inferred occupancy, inferred comfort settings for the AHU, etc. A system that runs the AHU1 can use the event stream to make operational decisions (e.g., determine heating levels, cooling levels, air pressure settings, fan levels, air mixture levels, etc.).

The cloud building graph 1102 and the edge building graph 1104 may both describe elements of the same building, in some embodiments. Therefore, the cloud building graph 1102 and the edge building graph 1104 can be related together. The interrelationships can enable the cloud building graph 1100 to be split apart but for queries or other actions to still consider the entire graph 1100, in some embodiments.

In some embodiments, an edge 1 node 1126 can be stored by the cloud building graph 1102 and/or the edge building graph 1104. The edge 1 node 1126 may represent the edge building graph 1104. Similarly, another node might describe the cloud building graph 1102 (e.g., as shown in FIG. 12). The graphs 1102 and/or 1104 can include edges that relate nodes of each graph 1102 and/or 1104 to the node 1126. Relating a node to the node 1126 may indicate that an object of the relationship exists in another graph, e.g., the graph indicated by the edge 1 node 1126. For example, if the edges are in the form of triples with subjects, predicates, and objects, relating a node (subject) via an edge (predicate) to the edge 1 node 1126 may indicate that the object for the relationship exists in another graph (e.g., a graph indicated by the node 1126). Similarly, if the edge 1 node 1126 is the subject of a triple, this may indicate that the subject of the triple is stored in another graph, e.g., the graph indicated by the edge 1 node 1126.

The VAV1-2 node 1114 is related to the AHU1 node 1128 via an edge "Edge1[AHU1]→feeds::Cloud1[VAV1-2]" 1144 between the edge 1 node 1126 and the VAV1-2 node 1114 and the edge "Edge1[AHU1]→feeds::Cloud1[VAV1-2]" edge 1164. The edges 1144 and 1164 can indicate that the AHU1 node 1128 (the subject) feeds (the predicate) the VAV1-2 node 1114 (object). The edges 1144 and 1164 can each identify the AHU1 node by name, provide an indication of which graph the AHU1 node is stored, e.g., "Edge1 [AHU1]" provide an indication of the direction of the relationship "→" (from the AHU1 to the VAV1-2) and indicate the location of the VAV1-2 node 1114 "Cloud1 [VAV1-2]." The "::" symbol can indicate a separation between graphs, e.g., a separation between the Edge1 graph (the graph 1104) and the Cloud1 graph (the graph 1102). The location of the "AHU1" on the left side of the arrow →can indicate that the AHU1 is the subject of the triple while the location of the VAV1-2 on the right side of the arrow "→" can indicate that the VAV1-2 is the object of the triple. Reversing the arrow "→" to "←" would indicate a reverse of the subject and object, in some embodiments. Furthermore, an arrow such as "↔" would indicate a bidirectional relationship where each node is both a subject and object, in some embodiments. The "feeds" portion of the edges 1144 and 1164 can indicate the semantic type (e.g., "isPartOf," "includes," etc.) of the edges 1144 and 1164.

While a particular syntax is provided in FIG. 11 for the edges relating nodes of different graphs, various other syntaxes could be used to relate the information. Furthermore, the relation of information could, in some embodiments, be stored within the nodes or edges of the graph 1100 itself and/or within a separate lookup table. In some embodiments, the lookup table could relate the graph names "Cloud1" and/or "Edge1" to physical devices that store the respective graphs, e.g., to system identifiers, to network addresses, to cryptographic communication codes, etc. In some embodiments, the lookup table can use obfuscation to hide identifying information of the devices storing the graphs 1102 and 1104.

The "Edge1 [AHU]→feeds Cloud[Floor1]" edge 1146 between the edge 1 node 1126 and the floor 1 node 118 and the "Edge1[AHU1]→feeds Cloud1[Floor1]" edge 1166 between the AHU1 node 1128 and the edge1 node 1126 can indicate that the AHU 1 feeds air to the floor 1. The "Cloud1[Floor1]→hasPart Edge1[Zone1-2]" edge 1154 between the floor 1 node 1118 and the edge 1 node 1126 and the "Cloud1[Floor1]→hasPart Edge1[Zone1-2]" edge 1168 between the edge 1 node 1126 and the zone1-2 node 1132 can indicate that the floor 1 has the zone1-2. The "Edge1 [AHU1]→feeds Cloud1[Floor2]" edge 1160 between the edge 1 node 1126 and the floor 2 node 1124 and the "Edge1[AHU1]→feeds Cloud1[Floor2]" edge 1162 between the edge 1 node 1126 and the AHU 1 node 1128 can indicate that the AHU1 feeds the floor 2.

By dividing the building graph 1100 into the graphs 1102 and 1104 but including the edges 1144-1146, 1154, 1160, 1162, 1164, 1166, and 1168 which link the graphs 1102 and 1104 together, queries can be executed which traverse the entire building graph 1100 without requiring the queries to specify which graph is being queried. For example, if a system provides a query for all parts of the floor 1, the query response can include the zone1-1 and the zone1-2, even though the zone 1-2 is stored in a graph separate from the floor 1. The query responding system can identify and retrieve an indication of the zone 1-2 based on traversing edges across the graphs 1102 and 1104, e.g., the edges 1154 and 1168. In some embodiments, a first system that is associated with the cloud building graph 1102 (e.g., stores the graph 1102) can complete a first portion of the query (e.g., identify the zone1-1) use the edge 1154 to identify that a second result for the query is stored in the graph 1104, and second the query to a second system associated with the edge building graph 1104. The second system can complete the query (e.g., identify the zone 1-2 node 1132 based on the edge 1168 or any other pieces of information in the graph 1104), and send a response to the first system.

The first system can then combine the results together and generate a query response based on the combined results. One or more application programming interfaces (APIs) can provide an interface for querying the graphs 1102-1104. Because the graphs 1102 and 1104 are linked together via edges, even though they may be stored in separate data storage devices, on different devices connected through one or more networks, etc., the queries provided to the API can be agnostic to (e.g., not include) information identifying where (or in what graph) the queried information resides, how to break down the queries into sub-parts, and/or how to route the queries. The API can break a query into various parts for each of the graphs 1102-1104 and route the queries to various devices to query the graphs stored by each device. One example of breaking a query down into sub-parts to produce a query result is found in U.S. patent application Ser. No. 15/409,489 filed Jan. 18, 2017 (now U.S. Pat. No. 10,480,804), the entirety of which is incorporated by reference herein.

In some embodiments, instead of including timeseries nodes, e.g., the node 1110 and/or the node 1112, the graph 1100 can store events, timeseries, and/or other data samples linked directly with an entity node (e.g., equipment, space, person, etc.). For example, a single edge may connect the data sample node directly to the entity node. In some embodiments, each entity, whether equipment, space, or a point, can include an edge to an event metadata node. The event metadata node can describe the type of data samples that can be associated with that entity. The data samples can be formatted according to a format defined by the metadata node but linked directly with the entity generating them, or in the case of inferred events, applied to them.

For example, if there is a meeting that gets booked in a conference room, the event describing that meeting room booking would be associated directly with the conference room entity itself. Furthermore, an event metadata entity can also be linked to a node representing the meeting room which describes a "MeetingRequest" event and its format. This metadata entity may describe the types of events that can be associated with that conference room entity.

Referring now to FIG. 12, a system 1200 is shown including the twin manager 108 and an edge device 1204 storing the building graph 1100 divided and distributed across the twin manager 108 and the edge device 1204, according to an exemplary embodiment. The twin manager 108 can be a cloud based device that includes the memory device(s) 150 and the processor(s) 148. The one or more memory device(s) 150 can store the cloud building graph 1102, the cloud agents 1206, the device-graph lookup table 1220, and/or any instructions that can be executed by the processor(s) 140 to store, manage, execute against, etc. the cloud building graph 1102 and/or the edge building graph 1104.

The edge device 1204 includes processor(s) 1210 and the memory device(s) 1212. The processor(s) 1210 and the memory device(s) 1212 can be similar to, or be the same type as, the processor(s) 148 and the memory device(s) 150. The edge device 1204 can be a device located on the edge, e.g., on-premises within a building, at a particular environment, in a vehicle, etc. The edge device 1204 could be a building controller, a vehicle computing system, a personal computer, an equipment controller, a METASYS ADX server, a building server, a fire response system, an access control system, a video surveillance system, etc. In some embodiments, the edge device 1204 can be a server of a cellular tower. For example, the edge device 1204 could be a 5G Mobile Edge Computing (MEC) system. 5G MEC systems can allow for communication with edge devices and processing for edge devices while only requiring communication via 5G, i.e., without requiring any other network hops (e.g., network hops across a core network, the Internet, etc.). 5G MEC is described in U.S. patent Ser. No. 17/221,064 filed Apr. 2, 2021, the entirety of which is incorporated by reference herein.

As an example, in some embodiments, the edge device 1204 is a field controller or an equipment controller. The controller could collect and store historical equipment data which can be stored in, or linked to, a building graph stored by the controller. The controller can further run various agents to perform fault detection and diagnosis for the equipment. The agents can run against the historical data, the graph stored by the controller, or another graph stored in a cloud or other edge system that includes information relating to making a fault detection for the equipment. For example, the other graphs could store information about the spaces, people, or equipment that might provide information that the controller could use in making a fault detection and/or diagnosis. For example, the information might indicate how other similar pieces of equipment are operating, the environmental data of various spaces controlled by the equipment, etc.

In some embodiments, the distributed digital twin can store both the portion of the building graph and the historical data necessary for the agents of the digital twin to execute. For example, the edge device 1204 could store a historical database, e.g., a timeseries database. In some embodiments, the timeseries data can be stored in the timeseries database with a link to a node of the edge building graph 1104. In this regard, the edge device 1204 could receive sensor measurements from the sensor devices 1214 and/or actuator feedback from the actuator devices 1216 and store the data, via a device manager 1218 of the edge device 1204, in the graph 1104 and/or in a historical database of the edge device 1204. In some embodiments, the device manager 1218 can store a link in a node of the edge building graph 1104 that links to a location in a separate database that aggregates the received sensor and/or actuator data.

In some embodiments, for a campus of multiple buildings or an entity with multiple building sites, one server could reside at each building. Each of the servers could store a building graph for the specific building that the servers are located in. The cloud server could store a backup graph of all of the graphs stored at each of the individual servers. In some embodiments, the cloud server could include a graph storing other high level information that is related to the information of one or more of the graphs of the servers. The servers could, in some embodiments, push gathered building data up to the cloud for the cloud to run algorithms against.

In some embodiments, the servers could retain the gathered building data and run algorithms for the respective buildings locally.

The twin manager 108 includes a device-graph lookup table while the edge device 1204 includes a device-graph lookup table 1222. The tables 1220 and/or 1222 can be tables that link a graph name to a specific device. The tables 1222 and/or 1220 can allow the interface 1224 of the twin manager 108 and/or the interface 1226 of the edge device 1204 to communicate with each other via the network 104. For example, the communication may be querying the graphs 1102 and/or 1104. The interfaces 1224 and/or 1226 can be circuits and/or pieces of software (e.g., API code) that handles communication, queries, commands, questions, etc. between the twin manager 108 and the edge device 1204.

In some cases, the interfaces 1224 and/or 1226 are shepherding agents that coordinate the local storage of a graph and/or agent between multiple devices. In some embodiments, the shepherding agents can coordinate communication between edge and cloud systems such that a gateway layer (e.g., the edge platform 102) is not needed to facilitate communication between the cloud (e.g., the cloud platform 106 and/or the twin manager 108) and edge devices (e.g., the building subsystems 122). The messaging and/or routing mechanisms provided by the interfaces 1224 and/or 1226 can allow for business logic, control algorithms, artificial intelligence (AI) models, machine learning (ML) models, etc. that might normally run in the cloud to be run in various edge or cloud systems.

The device-graph lookup table 1220 and/or the device-graph lookup table 1222 can link graph names of the graphs 1102 and/or 1104 to device identifiers and/or communication addresses of the twin manager 108 and/or edge device 1204. An example lookup table could be:

TABLE 1

| Graph Name | Device Identifier | Internet Protocol (IP) Address | MAC Address |
| --- | --- | --- | --- |
| Cloud1 | Cloud Server | 84.15.186.115 | 00-17-FC-3F-FF-FF |
| Cloud2 | Remote Computing System | 84.15.184.60 | 00-13-DD-F5-AB-F5 |
| Edge1 | Building Controller | 192.168.1.16 | 00-16-23-FF-44-25 |
| Edge2 | AHU Controller | 192.168.1.16 | 00-16-FC-22-56-21 |
| Edge3 | Data Collector | 192.0.2.1 | 00-13-CA-44-21-89 |
| Edge4 | Local Server | 192.0.2.1 | 00-19-FC-39-A6-99 |

Furthermore, each of the twin manager 108 and the edge device 1204 can store and execute agents, e.g., the twin manager 108 includes cloud agents 1206 while the edge device 1204 includes edge agents 1208. The agents 1206 and 1208 can be the same as, or similar to, the agents described in FIGS. 5-9. By running agents on various cloud and/or edge devices and/or by storing the parts of a building graph across the various cloud and/or edge devices can allow for a digital twin (or digital twins) to be distributed across various cloud and/or edge devices. By having agents running against parts of the graph stored on the various cloud and/or edge devices can allow for digital twin computing and/or storage to co-exist at the same location where the computations are being used, providing autonomous execution capabilities. For example, if a controller for an AHU stores a portion of a building graph describing the AHU and an agent stored on the controller provides algorithms for running the AHU, the AHU controller can run a digital twin for controlling the AHU through the agent and the building graph stored by the AHU. This localizes the storage and execution of a digital twin at edge devices.

This architecture shown in FIG. 12 also allow for flexibility of where the digital twin computations reside (e.g., on various clouds and/or edge devices). The architecture allows digital twin computations to not be co-located with the a cloud platform, e.g., the cloud platform 106 and/or the twin manager 108. Because the agents and graph can be stored locally with the edge device 1204, this can result in faster computing and/or control decisions since the computations are performed at the edge instead of requiring the edge device 1204 to wait for communication over the network 104 with the twin manager 108.

In some embodiments, one or multiple edge devices could store an edge graph that is not utilized unless a connection to a cloud system is offline and/or the cloud system is not operating properly. In this regard, the edge graph could be in a dormant mode where the edge devices store and/or maintain the graph but do not execute any applications against the graph, e.g., run a digital twin at the edge. The dormant graph could provide redundancy with the graph stored in the cloud system (e.g., include at least some of the same nodes and edges). The edge devices can perform operations based on a digital twin running in the cloud system. However if the edge devices become disconnected from the cloud system or the cloud system goes offline, edge systems can run an edge digital twin based on the edge graphs stored by the edge systems, e.g., "wake up" the edge digital twin.

Referring now to FIG. 13, the distributed building graph 1100 generated across the twin manager 108 and an edge device 1204 during an onboarding process is shown, according to an exemplary embodiment. The edge device 1204, the twin manager 108, and the building controller 1306 can construct the building graph 1100 in a distributed manner. The edge device 1204, the twin manager 108, and the building controller 1306 include onboarding tools for constructing the graph, e.g., onboarding tool 1304, onboarding tool 1308, and onboarding tool 1312.

The onboarding tools can build the building graph 1100 in a piecemeal manner from the various device that the onboarding tools reside. While the building graph is constructed, each edge system can identify which pieces of the graph should be stored locally, e.g., which pieces the edge system needs to execute and which pieces of the constructed graph should be pushed to the cloud. The edge systems can further identify which portions of the graph to keep locally based on privacy. In some cases, the portions of the building graph that are retained locally at the edge can be linked via one or more nodes or edges with other portions of the building graphs stored by the other edge systems and/or cloud systems.

In some embodiments, the onboarding tool 1308 of the twin manager 108 is pushed data collected by the edge device 1204 and data collected by the building controller 1306. The twin manager 108 (e.g., via the onboarding tool 1308) can generate a graph based on all of the data received. The twin manager 108 can make decisions of what portions of the graph should be pushed to the edge device 1204 and the building controller 1306. In some embodiments, each onboarding tool 1304, 1308, and 1312 locally builds a graph to be stored locally on each of the edge device 1204, the twin manager 108, and the building controller 1306. Similarly, in some embodiments, each edge device can identify what agents the edge device needs to execute to operate the equipment managed by the edge device. The edge devices can retrieve the agent from the twin manager 108, in some embodiments. In some embodiments, the twin manager 108 can analyze the graph of each edge device (or a complete graph stored by the twin manager 108) and determine what agents to push to the edge devices.

In some embodiments, the onboarding tools 1304, 1308, and 1312 can continue managing and updating the graphs stored on the edge device 1204, the twin manager 108, and the building controller 1306 respectively. As devices of the building change (which may be infrequent) the onboarding tools 1304, 1308, and 1312 can perform updates to the various graphs and maintain consistent linkages across the various graphs.

In FIG. 13, the building controller manages an AHU controller 1322 and a VAV1-2 controller 1316. The AHU controller 1322 communicates with various AHU sensors 1324 and AHU actuators 1326. The VAV1-2 controller communicates with VAV sensors 1318 and VAV actuators 1320. The onboarding tool 1304 can receive metadata from the AHU controller 1322 and the metadata from the VAV1-2 controller 1316 defining the AHU sensors 1324, the AHU actuators 1326, the VAV sensors 1318, and the VAV actuators 1320. The onboarding tool 1304 can analyze the metadata to construct the edge building graph 1104.

The onboarding tool 1304 can perform various data analysis techniques to generate the edge building graph 1104 from the metadata, e.g., the techniques described in U.S. patent Ser. No. 16/885,959 filed May 28, 2020, U.S. patent Ser. No. 16/885,968 filed May 28, 2020, U.S. patent Ser. No. 16/663,623 filed Oct. 25, 2019, and U.S. patent Ser. No. 16/722,439 filed Dec. 20, 2019, the entirety of each of which are incorporated by reference herein.

Furthermore, the onboarding tool 1304 can build the edge building graph 1104 based on information received from the twin manager 108 and/or the building controller 1306. For example, the onboarding tool 1312, while using data to build an edge building graph 1310 for the building controller 1306, can communicate the data to the twin manager 108 and/or the edge device 1204. In some embodiments, the twin manager 108 can communicate metadata received from the building controller 1306 to the edge device 1204.

In some embodiments, the data received by the edge device 1204 from the twin manager 108 is data describing the VAV1-1 controller 1314 that communicates with the building controller 1306. The data can provide an indication of the VAV1-1, an indication that the floor 1 and the floor2 are fed by AHU1, and an indication that the zone1-2 is part of the floor1. The onboarding tool 1304 can use the data to generate the edges 1162-1168.

Figure 14:
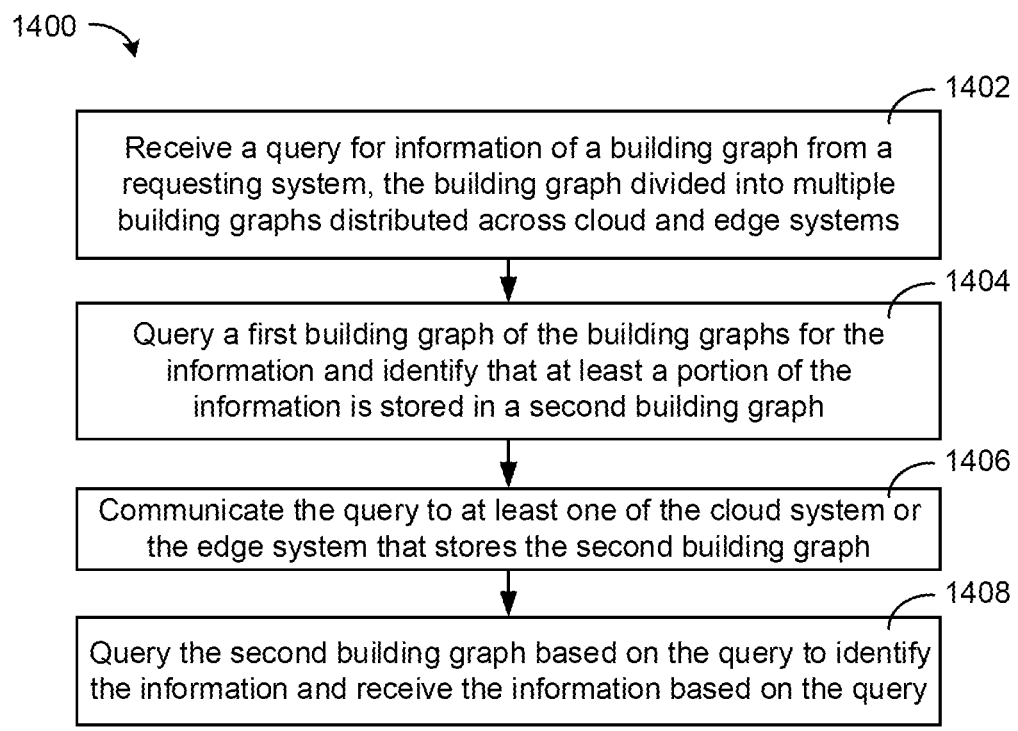
FIG. 14 is a flow diagram of a process of querying a building graph divided into multiple building graphs distributed across cloud and edge systems, according to an exemplary embodiment.

Referring now to FIG. 14, a process 1400 of querying a building graph divided into multiple building graphs distributed across cloud and edge systems is shown, according to an exemplary embodiment. The process 1400 can be performed by the twin manager 108 and the edge device 1204. The process 1400 can be performed by one or more edge systems and/or one or more cloud systems. Furthermore, any computing device or group of computing devices can perform the process 1400.

In step 1402, a system can receive a query for information of the building graph 1100 where the building graph 1100 is divided into multiple building graphs (e.g., the cloud building graph 1102 and the edge building graph 1104) distributed across multiple device (e.g., the twin manager 108 and/or the edge device 1204). In some embodiments, the query is an agent query generated by an agent, e.g., the cloud agents 1206 or the edge agents 1208. The agent queries can be generated by the agents responsive to the agent identifying that it requires information not stored in a graph that the agent has direct access to (e.g., the cloud agents 1206 have direct access to the cloud building graph 1102.). In some embodiments, the queries are generated by applications (the applications 110) that require some piece of information. In some embodiments, the queries are received, handled, and answered by the interfaces 1224 and 1226.

In step 1404, the system can query a first building graph of the building graphs for the information and identify that at least a portion of the information is stored in a second building graph. For example, the interface 1224 could query the cloud building graph 1102 for information. In some embodiments, the interface 1224 retrieves at least a portion of the information from the cloud building graph 1102 to be returned in response to the query. However, the interface 1224 may further identify, based on the edges 1144, 1146, 1154, 1160, 1162, 1164, 1166, and/or 1168, that the information (or a portion of the information) needed to respond to the query is stored in the edge building graph 1104.

For example, if the query is for zones controlled by a VAV, the interface 1224 can identify the zone1-1 node 1116 and identify that the zone1-1 1116 is fed by the VAV1-2 1114. Furthermore, the interface 1224 can identify that the floor 1 node 1118 has a zone1-2 via edge 1154 and identify based on the edge 1154 being related to the edge1 node 1126, the information describing the zone1-2 is in the edge building graph 1104.

In step 1406, the system can communicate the query to at least one of the cloud system or the edge system that stores the second building graph. For example, the interface 1226 may communicate a query to the interface 1224 for the interface 1224 to generate a result based on. Similarly, the interface 1224 may communicate a query to the interface 1226 for the interface 1226 to generate a result based on.

Continuing the previous example, responsive to identifying that the building graph 1104 potentially stores information that should be returned in the query for zones controlled by a VAV, in the step 1406 the system, e.g., the interface 1224 can communicate the query to the interface 1226. The interface 1224 may identify, based on the device-graph lookup table 1220 that the edge device 1204 stores the "Edge1" graph (e.g., the edge building graph 1104), the "Edge1" graph indicated by the edge 1154. The interface 1226 can query the edge building graph 1104 for zones controlled by VAVs.

In step 1408, the system can query the second building graph based on the query to identify the information and receive the information based on the query. Again, continuing the previous example, the interface 1226 can communicate the result of the query of the edge building graph 1104 back to the interface 1224. The interface 1224 can compose a response (e.g., combine results from the graph 1102 and/or the graph 1104 or include results of only the graph 1102 and/or the graph 1104). The response can be returned by the interface 1224 to the requesting system, e.g., the cloud agents 1206, applications, a user device, etc.

Figure 15:
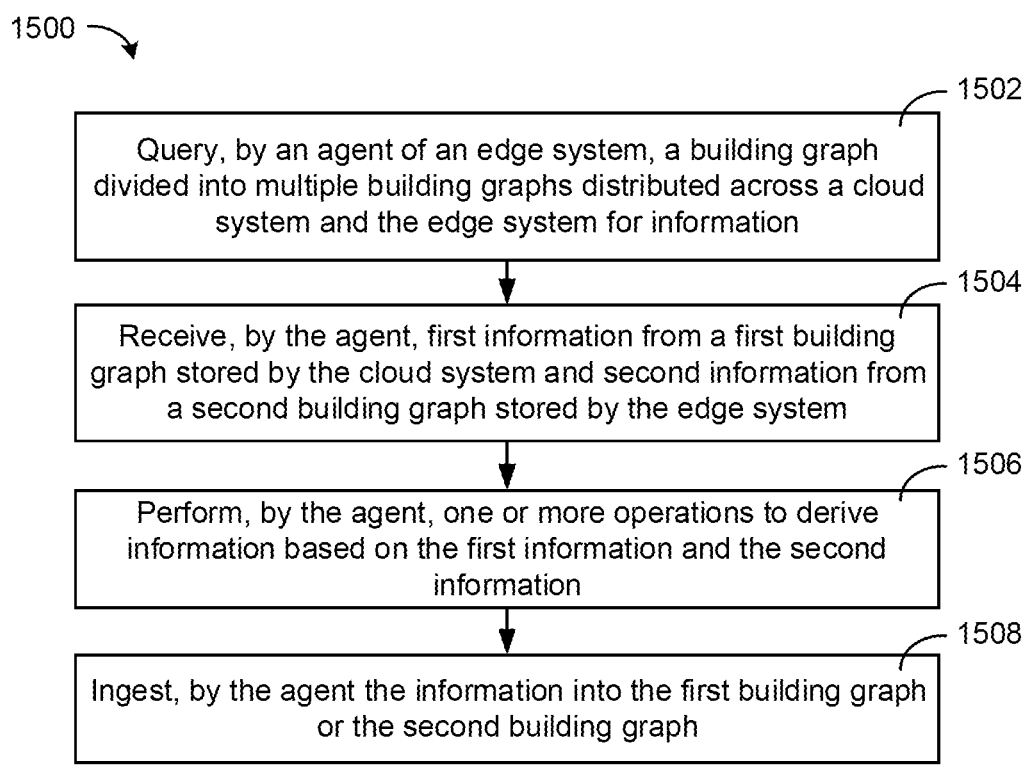
FIG. 15 is a flow diagram of a process of querying a building graph divided into multiple building graphs distributed across cloud and edge systems by an agent, and ingesting information back into the building graph by the agent, according to an exemplary embodiment.

Referring now to FIG. 15, a process 1500 of querying a building graph divided into multiple building graphs distributed across cloud and edge systems by an agent, and ingesting information back into the building graph by the agent is shown, according to an exemplary embodiment. The process 1500 can be performed by the twin manager 108 and the edge device 1204. The process 1500 can be performed by one or more edge systems and/or one or more cloud systems. Furthermore, any computing device or group of computing devices can perform the process 1500.

In step 1502, an agent of the edge agents 1208 of the edge device 1204 can query the building graph 1100 divided into multiple building graphs (e.g., the cloud building graph 1102 and the edge building graph 1104) and distributed across the cloud system (e.g., the twin manager 108) and the edge device (e.g., the edge device 1204) for information. The information can be information that the agent requires to perform operations, e.g., infer information, generate control decisions, run a temperature control algorithm, run an air quality algorithm, etc. In some embodiments, the agent queries the graphs 1102 and 1104 by providing the query to the interface 1226. The interface 1226 can run the query, generate the query response, and provide the query response back to the agent.

In step 1504, the agent can receive first information from the first building graph stored by the cloud system and second information from a second building graph stored by the edge system. In some embodiments, the interface 1226 can compose a response including the first information and the second information and return the response to the agent. The cross-graph query can be the query described in the process 1400 of FIG. 14.

In step 1506, the agent performs one or more operations to derive information based on the first information and the second information received in the step 1504. In some embodiments, the agent may perform artificial intelligence (AI) based analysis to generate an event stream. The event stream may indicate a schedule of AI settings indicating the times at which settings should change. In step 1508, the agent can ingest the information derived in the step 1506 into the first building graph or the second building graph. For example, the agent could ingest the AI inference event stream into the node 1134. In some embodiments, the device manager 1218 and/or the agent can push the settings to the AHU (e.g., an actuator of the AHU such as the actuator device 1216) to operate the AHU to control environmental conditions of a building (e.g., temperature, humidity, air quality, etc.).

Figure 16:
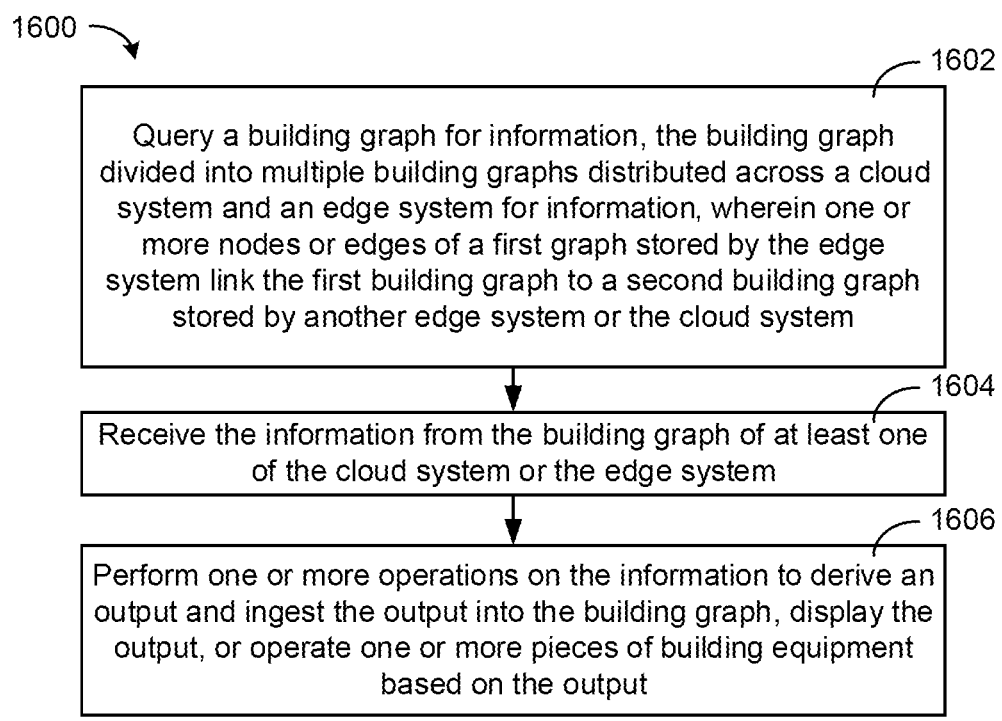
FIG. 16 is a flow diagram of a process of querying a building graph divided into multiple graphs distributed across a cloud system and an edge platform and using information queried from the building graph to perform one or more operations, according to an exemplary embodiment.

Referring now to FIG. 16, a process 1600 is shown of querying a building graph divided into multiple graphs distributed across a cloud system and an edge platform and using information queried from the building graph to perform one or more operations, according to an exemplary embodiment. The process 1600 can be performed by the twin manager 108 and the edge device 1204. The process 1600 can be performed by one or more edge systems and/or one or more cloud systems. Furthermore, any computing device or group of computing devices can perform the process 1600.

In step 1602, a system (e.g., the twin manager 108 and/or the edge device 1204) can query the building graph 1100 for information, the building graph 1100 divided into multiple building graphs distributed across a cloud system and an edge system, wherein one or more nodes or edges of a first graph stored by the edge system link the first building graph to a second building graph stored by another edge system or the cloud system. In some embodiments, the system performing the query can be an edge system, the cloud system, etc. In some embodiments, the query can be made across multiple graphs based on the edges that connect the graphs, e.g., the edges 1144, 1146, 1154, 1160, and/or 1162-1168. In some embodiments, the system can identify which graph to query information from based on how the edges link the various graphs. The query can be performed across the building graphs as described in the process 1400 by FIG. 14.

In step 1604, the system can receive the information from the building graph of the cloud system and/or the edge system. For example, the edge device 1204 could receive information of the edge building graph 1104 of the edge device 1204 or from the cloud building graph 1102 of the twin manager 108 or an edge building graph of another edge device. Similarly, the twin manager 108 could receive information from the cloud building graph 1102 and/or the edge building graph 1104 of the edge device 1204.

In step 1606, the system can perform one or more operations on the information received in the step 1604 to derive an output and ingest the output into the building graph (e.g., the building graph 1102 or the edge building graph 1104). The derived information can be displayed in the user device 176 for review by a user, and/or use the information to operate building systems of the building, e.g., the building subsystems 122, to control environmental conditions of a building, e.g., temperature, pressure, humidity, air quality, light, etc..

Figure 17:
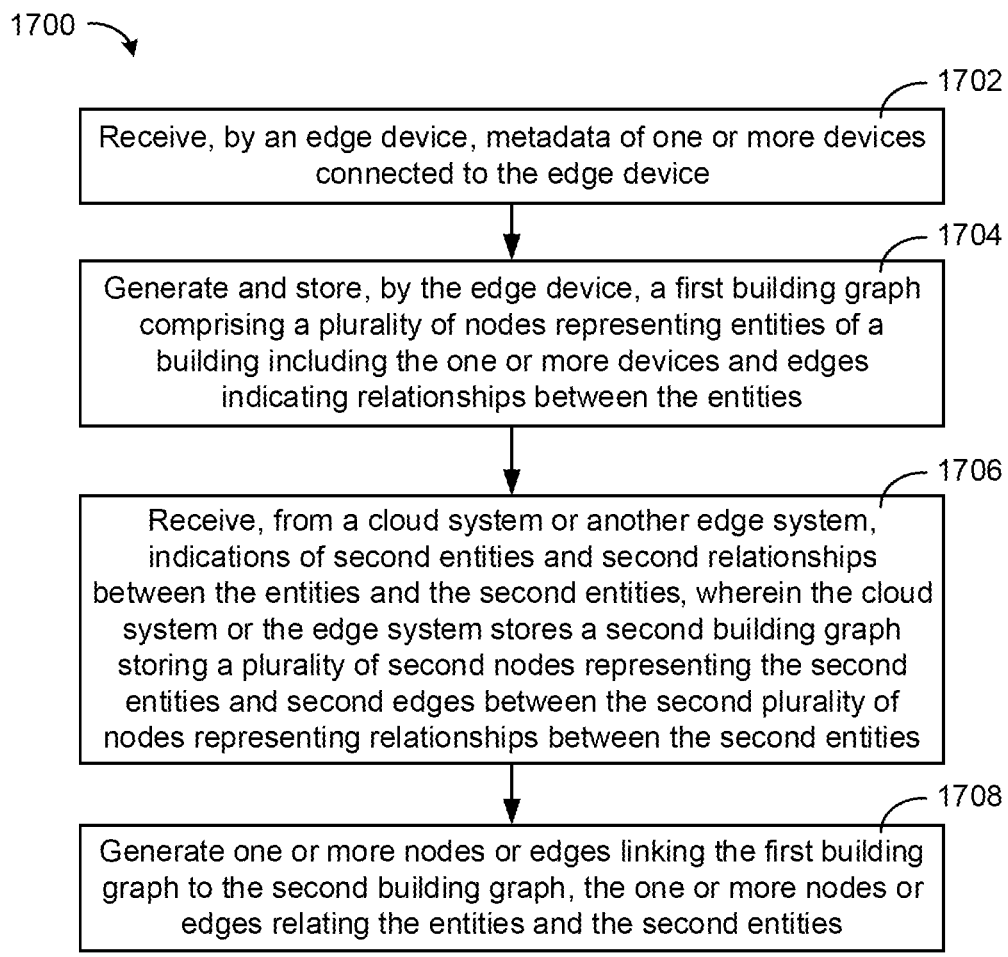
FIG. 17 is a flow diagram of a process where the distributed building graph is generated across the twin manager and a building controller during onboarding, according to an exemplary embodiment.

Referring now to FIG. 17, a process 1700 where the distributed building graph 1100 is generated across the twin manager 108 and an edge device 1204 during onboarding is shown, according to an exemplary embodiment. The process 1700 can be performed by the edge device 1204 and the twin manager 108. The process 1700 can be performed by one or more edge systems and/or one or more cloud systems. Furthermore, any computing device described herein can be configured to perform the process 1700.

In step 1702, the edge device 1204 can receive metadata from one or more devices connected to the edge device 1204. For example, the metadata may be self-describing information of the one or more devices, e.g., device name, device purpose, device network identifier, device space location, sensor points, actuator points, units, data produced, etc. In some embodiments, the edge device 1204 receives, via the onboarding tool 1304, metadata from the AHU controller 1322 describing the AHU controller 1322 and/or the AHU sensors 1324 and/or the AHU actuators 1326 that are connected to (and/or controlled by) the AHU controller 1322. Similarly, in some embodiments, the edge device 1204 receives, via the onboarding tool 1304, metadata from the VAV1-2 controller 1316 describing the VAV1-2 controller 1316 and/or the VAV sensors 1318 and/or the VAV actuators 1320 that are connected to (and/or controlled by) the VAV1-2 controller 1316.

In step 1704, the edge device 1204 (e.g., via the onboarding tool 1304) generates a first building graph, e.g., the edge building graph 1104, which includes multiple nodes representing entities of the building including the one or more devices for which metadata is received in the step 1702. The graph can further include edges that indicates the relationships between the entities. For example, based on the metadata received for the AHU controller 1322 (e.g., an identifier "AHU1") and the metadata received for the VAV1-2 controller 1316 (e.g., an identifier "VAV1-2"), the onboarding tool 1304 could generate the respective the AHU1 node 1128 representing the AHU controlled by the AHU controller 1322 and the VAV1-2 node 1130 representing the VAV controlled by the VAV1-2 controller 1316.

Furthermore, the metadata received from the AHU controller 1322 and/or the VAV1-2 controller 1316 could indicate that the AHU1 feeds the VAV1-2 air. This could be identified though an explicit indication that the VAV1-2 receives air from the AHU1, though an identification of parameters controlled by the AHU controller affecting measurements of the VAV1-2, indications of network connections between the AHU controller 1322 and/or VAV1-2 controller 1316 indicating a control relationship, etc. The indication of the relationship can be used by the onboarding tool 1304 to generate the feeds edge 1170 linking the AHU1 node 1128 and the VAV1-2 node 1130. The onboarding tool 1304 could further receive a location tag from the VAV1-2 controller 1316. The location tag could indicate "zone1-2" or any other location name, e.g., "Main Lobby," "Bob's Office," "Family Room," etc. The location tag may, in some embodiments, be programmed by a user for the VAV1-2 controller 1316 when the VAV1-2 controller 1316 is first installed. The onboarding tool 1304 can generate the zone1-2 node 1132 for the location of the VAV1-2 and generate a feeds edge 1172 between the VAV1-2 node 1130 and the zone1-2 node 1132 based on the indication that the VAV1-2 is installed in the zone1-2.

In some embodiments, the edge agents 1208 may execute operations against the edge building graph 1104. The results of the edge agents 1208 can, in some embodiments, be used by the edge agents 1208 and/or the onboarding tool 1304 to generate a node for the inferences produced by the edge agents 1208. For example, if the edge agents 1208 derive information for the AHU1, the edge device 1204 can cause the edge building graph 1104 to include an AI inference event stream node 1134 and an edge 1174 between the AHU1 node 1128 and the node 1134.

In step 1706, the edge device 1204 can receive, from a cloud system or another edge system, indications of second entities and second relationships between the entities and the second entities. The cloud system or another edge system may store a second building graph storing a plurality of second nodes representing the second entities and second edges between the second plurality of nodes representing relationships between the second entities. In some embodiments, the second building graph is generated in a similar manner as described in steps 1702-1704 by the cloud system or the other edge system. In step 1708, the edge device 1204 can generate one or more nodes or edges linking the first building graph to the second building graph, the one or more nodes or edges relating the entities and the second entities.

In some embodiments, the edge device 1204 the onboarding tool 1304 of the edge device 1204 may receive an indication of, or data of, the cloud building graph 1102 from the twin manager 108. The onboarding tool 1304 can use the received data from the twin manager 108 to generate the node 1126 and/or the edges 1162-1168. For example, in some embodiments, a name or other indicator of the cloud building graph 1102 received from the twin manager 108 can be used by the edge device 1204 to generate the cloud1 node 1126 representing the cloud building graph 1102. Furthermore, the data received by the edge device 1204 from the twin manager 108 can indicate relationships between the nodes stored by the edge building graph 1104 and the nodes stored by the cloud building graph 1102.

For example, the edge device 1204 may receive an indication of a "VAV1-1" represented as a node in the cloud building graph 1102. Furthermore, the edge device 1204 can receive an indication that the "VAV1-1" is fed by the AHU1 which is represented in the cloud building graph 1102. Responsive to receiving this data, the edge device 1204 can generate the edge 1162 between the AHU1 node 1128 and the cloud1 node 1126. Furthermore, the edge device 1204 could receive indications that two floors, floor 1 and floor 2 are also fed by the AHU1. Responsive to receiving this data, the edge device 1204 can generate the edges 1166 and 1162 between the AHU1 node 1128 and the cloud1 node 1126. In some embodiments, the edge device 1204 can receive an indication that the cloud building graph 1102 includes a node that describes a floor that the zone1-2 represented by the zone1-2 node 1132 is a part of. Responsive to receiving this data, the edge device 1204 can generate the edge 1168 between the cloud1 node 1126 and the zone1-2 node 1132.

In some embodiments, a single system or device (e.g., the twin manager 108 and/or the edge device 1204) could receive metadata from a variety of data sources, e.g., directly or indirectly from controllers, sensors, actuators, from one or more databases, from a user device, etc. The system can identify one or more edge systems or cloud systems that include processing resources (e.g., memory availability, storage availability, processing speed, number of processor cores, etc.) necessary to store and run a digital twin (e.g., a building graph and/or one or more agents). The system can construct multiple building graphs with interconnections. The system can communicate, via the network 104, the building graphs to the one or more edge systems and/or cloud systems. In some embodiments, the twin manager 108 can construct the various graphs and push the graphs to the various edge devices. In some embodiments, the twin manager 108 may retain nodes or edges in the cloud that are linked to the nodes and/or edges of the graphs of the various edge devices.

In some embodiments, a user may construct a digital twin via the user device 176. In some embodiments, the user may provide input to the twin manager 108, the user input defining one or multiple different graphs via the user device 176. The user input can, in some embodiments, define the nodes and/or edges of each graph and interconnections between the graphs. The user input may further provide an assignment of each graph to a particular system, e.g., edge system, cloud system, etc. The twin manager 108, responsive to receiving a user command, push the graphs to the various edge systems and/or cloud systems. Examples of constructing a graph via user input is described in U.S. patent application Ser. No. 16/723,087, filed Dec. 20, 2019 and U.S. patent application Ser. No. 16/175,507 filed Oct. 30, 2018, the entireties of which are incorporated by reference herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:
1. A method comprising:
receiving, by one or more processing circuits, at least a portion of building data describing a plurality of entities of a building and a plurality of relationships between the plurality of entities, the plurality of entities represent at least one of a device, a space, the building, a point, or a person;
generating, by the one or more processing circuits, a first digital twin based on the building data, wherein a first system stores the first digital twin and a second system stores a second digital twin generated based on the building data, wherein the first digital twin includes a plurality of first entities of the plurality of entities and a plurality of first relationships of the plurality of relationships between the plurality of first entities, wherein the second digital twin includes a plurality of second entities of the plurality of entities and a plurality of second relationships of the plurality of relationships between the plurality of second entities, wherein the first digital twin includes a relationship between a first entity of the plurality of first entities stored within the first digital twin and a second entity of the plurality of second entities stored within the second digital twin, the first entity representing a first person, space, building, point, event, or piece of equipment, the second entity representing a second person, space, building, point, event, or piece of equipment;

querying, by a processing circuit of the first system, the first digital twin based on a query, the one or more processing circuits comprising the processing circuit of the first system;

identifying, by the processing circuit of the first system, that a query result of the query is stored in the second digital twin based on the relationship;

communicating, by the processing circuit of the first system, the query to the second system;

receiving, by the processing circuit of the first system, the query result, wherein the query result is based on the second system querying the second digital twin based on the query; and performing, by the processing circuit of the first system, one or more operations based on the query result.

2. The method of claim 1, wherein the first system comprises a cloud system stored off premises from the building and the second system comprises an edge system stored on a premises of the building.

3. The method of claim 1, wherein the one or more processing circuits include a second processing circuit of the second system.

4. The method of claim 1, comprising:
executing, by the processing circuit of the first system, an agent stored by the first system, the agent configured to perform the one or more operations based on the first digital twin; and
ingesting, by the agent, a result of the one or more operations into the first digital twin.

5. The method of claim 1, wherein the second digital twin includes a second relationship that forms a connection between the second digital twin and the first digital twin by linking the second entity of the plurality of second entities of the second digital twin and the first entity of the plurality of first entities of the first digital twin.

6. The method of claim 1, comprising:
performing an onboarding to generate the first digital twin and the second digital twin by:
receiving, by the processing circuit of the first system, first building data of the building data;
generating, by the processing circuit of the first system, the first digital twin based on the first building data;
receiving, by a second processing circuit of the second system, second building data of the building data;
generating, by the second processing circuit of the second system, the second digital twin based on the second building data;
identifying, by the first processing circuit of the first system, the relationship by communicating with the second system; and
causing, by the first processing circuit of the first system, the first digital twin to include the relationship.

7. The method of claim 1, wherein the first digital twin includes a first graph structure including a plurality of first nodes representing the plurality of first entities and a plurality of first edges between the plurality of first nodes representing the plurality of first relationships between the plurality of first entities;
wherein the second digital twin includes a second graph structure including a plurality of second nodes representing the plurality of second entities and a plurality of second edges between the plurality of second nodes representing the plurality of second relationships between the plurality of second entities.

8. The method of claim 7, wherein the first graph structure includes a node identifying the second graph structure;
wherein the first graph structure includes an edge between a first node of the plurality of first nodes representing the first entity and the node identifying the second graph structure, wherein the edge represents the relationship between the first entity of the plurality of first entities of the first digital twin and the second entity of the plurality of second entities of the second digital twin.

9. The method of claim 8, wherein the edge includes data including:
a first indication of the first entity;
a second indication that the first entity is stored by the first graph structure;
a third indication of the second entity;
a fourth indication that the second entity is stored by the second graph structure; and
a fifth indication of a relationship type of a plurality of relationship types describing the relationship between the first entity of the plurality of first entities of the first digital twin and the second entity of the plurality of second entities of the second digital twin.

10. The method of claim 1, wherein the one or more processing circuits include a second processing circuit of the second system;
wherein the method further comprises:
receiving, by the second processing circuit of the second system, the query from the processing circuit of the first system;
querying, by the second processing circuit of the second system, the second digital twin with the query to generate the query result; and
communicating, by the second processing circuit of the first system, the query result to the processing circuit of the first system.

11. The method of claim 1, further comprising:
identifying, by the processing circuit of the first system, that the second system stores the second digital twin based on a lookup table,
wherein the lookup table stores a plurality of indications of digital twins including the first digital twin and the second digital twin and links between the digital twins and systems that store the digital twins, the systems including the first system and the second system.

12. A system including:
one or more memory devices storing instructions thereon that, when executed by one or more processors, cause the one or more processors to:

receive at least a portion of building data describing a plurality of entities of a building and a plurality of relationships between the plurality of entities, the plurality of entities represent at least one of a device, a space, the building, a point, or a person;

generate a first digital twin based on the building data, wherein the system stores the first digital twin and a second system stores a second digital twin generated based on the building data, wherein the first digital twin includes a plurality of first entities of the plurality of entities and a plurality of first relationships of the plurality of relationships between the plurality of first entities, wherein the second digital twin includes a plurality of second entities of the plurality of entities and a plurality of second relationships of the plurality of relationships between the plurality of second entities, wherein the first digital twin includes a relationship between a first entity of the plurality of first entities stored within the first digital twin and a second entity of the plurality of second entities stored within the second digital twin, the first entity representing a first person, space, building, point, event, or piece of equipment, the second entity representing a second person, space, building, point, event, or piece of equipment;

query the first digital twin based on a query;

identify that a query result of the query is stored in the second digital twin based on the relationship;

communicate the query to the second system;

receive the query result, wherein the query result is based on the second system querying the second digital twin based on the query; and perform one or more operations based on the query result.

13. The system of claim 12, wherein the system and the second system are at least one of a cloud system stored off premises from the building or an edge system stored on a premises of the building.

14. The system of claim 12, wherein the instructions cause the one or more processors to:
execute an agent stored by the first system, the agent configured to perform the one or more operations based on the first digital twin; and
ingest a result of the one or more operations into the first digital twin.

15. The system of claim 12, wherein the second digital twin includes a second relationship that forms a connection between the second digital twin and the first digital twin by linking the second entity of the plurality of second entities of the second digital twin and the first entity of the plurality of first entities of the first digital twin.

16. The system of claim 12, wherein the first digital twin includes a first graph structure including a plurality of first nodes representing the plurality of first entities and a plurality of first edges between the plurality of first nodes representing the plurality of first relationships between the plurality of first entities;
wherein the second digital twin includes a second graph structure including a plurality of second nodes representing the plurality of second entities and a plurality of second edges between the plurality of second nodes representing the plurality of second relationships between the plurality of second entities.

17. One or more non-transitory computer readable medium storing instructions thereon that, when executed by one or more processors, cause the one or more processors to:

receive at least a portion of building data describing a plurality of entities of a building and a plurality of relationships between the plurality of entities, the plurality of entities represent at least one of a device, a space, the building, a point, or a person;

generate a first digital twin based on the building data, wherein a first system stores the first digital twin and a second system stores a second digital twin generated based on the building data, wherein the first digital twin includes a plurality of first entities of the plurality of entities and a plurality of first relationships of the plurality of relationships between the plurality of first entities, wherein the second digital twin includes a plurality of second entities of the plurality of entities and a plurality of second relationships of the plurality of relationships between the plurality of second entities, wherein the first digital twin includes a relationship between a first entity of the plurality of first entities stored within the first digital twin and a second entity of the plurality of second entities stored within the second digital twin, the first entity representing a first person, space, building, point, event, or piece of equipment, the second entity representing a second person, space, building, point, event, or piece of equipment;

perform one or more operations based on data received from the second system, the data based on the second digital twin;

identify a communication issue between the first system and the second system; and perform the one or more operations based on second data determined based on the first digital twin.

18. The one or more non-transitory computer readable medium of claim 17, wherein the instructions cause the one or more processors to:
query the first digital twin based on a query;
identify that a query result of the query is stored in the second digital twin based on the relationship;
communicate the query to the second system;
receive the query result, wherein the query result is based on the second system querying the second digital twin based on the query; and
perform the one or more operations based on the query result.

19. The method of claim 1, comprising:
performing, by the one or more processing circuits, one or more particular operations based on data received from the second system, the data based on the second digital twin;
identifying, by the one or more processing circuits, a communication issue between the first system and the second system; and
performing, by the one or more processing circuits, the one or more particular operations based on second data determined based on the first digital twin.

20. The system of claim 12, wherein the instructions cause the one or more processors to:
perform one or more particular operations based on data received from the second system, the data based on the second digital twin;
identify a communication issue between the first system and the second system; and
perform the one or more particular operations based on second data determined based on the first digital twin.

* * * * *